(12) United States Patent
Yata et al.

(10) Patent No.: US 10,120,238 B2
(45) Date of Patent: Nov. 6, 2018

(54) DISPLAY DEVICE

(71) Applicant: Japan Display Inc., Tokyo (JP)

(72) Inventors: Tatsuya Yata, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/651,317

(22) Filed: Jul. 17, 2017

(65) Prior Publication Data

US 2018/0024403 A1 Jan. 25, 2018

(30) Foreign Application Priority Data

Jul. 22, 2016 (JP) .................................. 2016-144689

(51) Int. Cl.
*G02F 1/1334* (2006.01)
*G02F 1/1335* (2006.01)

(52) U.S. Cl.
CPC ...... *G02F 1/133615* (2013.01); *G02F 1/1334* (2013.01); *G02F 1/133514* (2013.01); *G02F 2001/133618* (2013.01); *G02F 2201/58* (2013.01)

(58) Field of Classification Search
CPC . G02F 1/1334; G02F 1/133615; G02F 1/1326
USPC .......................................................... 349/86
See application file for complete search history.

(56) References Cited

U.S. PATENT DOCUMENTS

| | | | |
|---|---|---|---|
| 2011/0169877 A1* | 7/2011 | Ishida | G02F 1/1334 345/690 |
| 2012/0098875 A1* | 4/2012 | Shinkai | G02B 6/0036 345/690 |
| 2013/0258711 A1 | 10/2013 | Okuyama et al. | |
| 2014/0104521 A1 | 4/2014 | Nishimura et al. | |
| 2014/0139461 A1 | 5/2014 | Furukawa et al. | |
| 2014/0232834 A1 | 8/2014 | Sato et al. | |
| 2014/0240642 A1 | 8/2014 | Furukawa et al. | |
| 2014/0300528 A1 | 10/2014 | Ebisui et al. | |
| 2016/0070047 A1 | 3/2016 | Okuyama et al. | |
| 2016/0231497 A1 | 8/2016 | Kato | |
| 2017/0097548 A1* | 4/2017 | Aoyama | G02F 1/134363 |
| 2017/0103715 A1 | 4/2017 | Oyama | |
| 2017/0160592 A1* | 6/2017 | Okuyama | G02F 1/133553 |

FOREIGN PATENT DOCUMENTS

| | | |
|---|---|---|
| JP | 11-183902 A | 7/1999 |
| JP | 2013-080646 A | 5/2013 |

* cited by examiner

*Primary Examiner* — Christopher Raabe
(74) *Attorney, Agent, or Firm* — Michael Best & Fredrich LLP

(57) ABSTRACT

According to one embodiment, a display device comprises first and second substrate having light transmissivity and opposing each other, a light-modulating layer arranged between the first substrate and the second substrate, a light source unit which illuminates the light-modulating layer from an outer side of a position which opposes a display area, along a normal direction, first to third color filters of different colors arranged on the first substrate, and first to third electrodes which oppose the first to third color filters, respectively, the light-modulating layer being able to change light dispersibility of each of regions which oppose the first to third color filters according to the electric field produced by each respective one of the first to third electrodes.

16 Claims, 25 Drawing Sheets

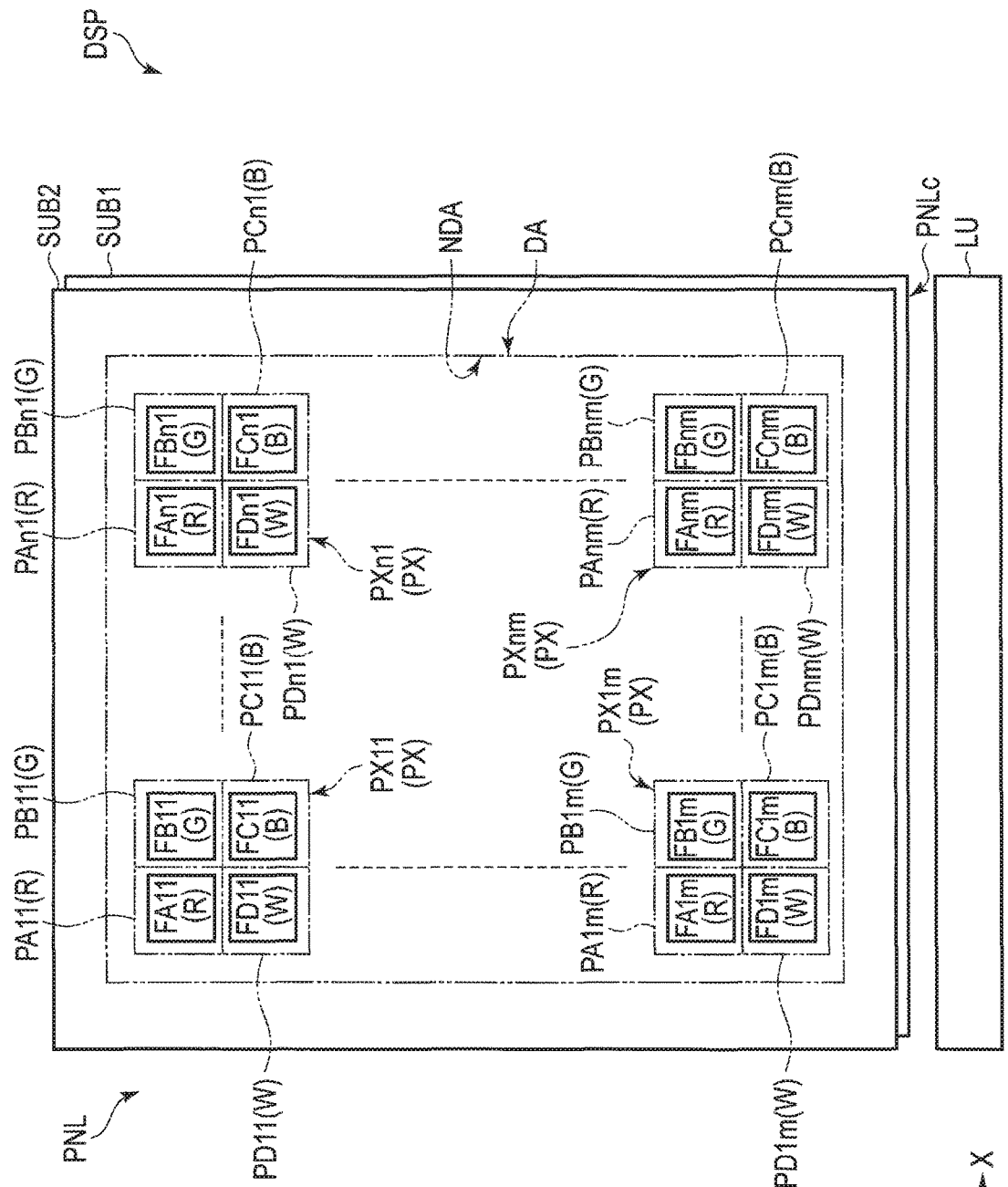
F I G. 1

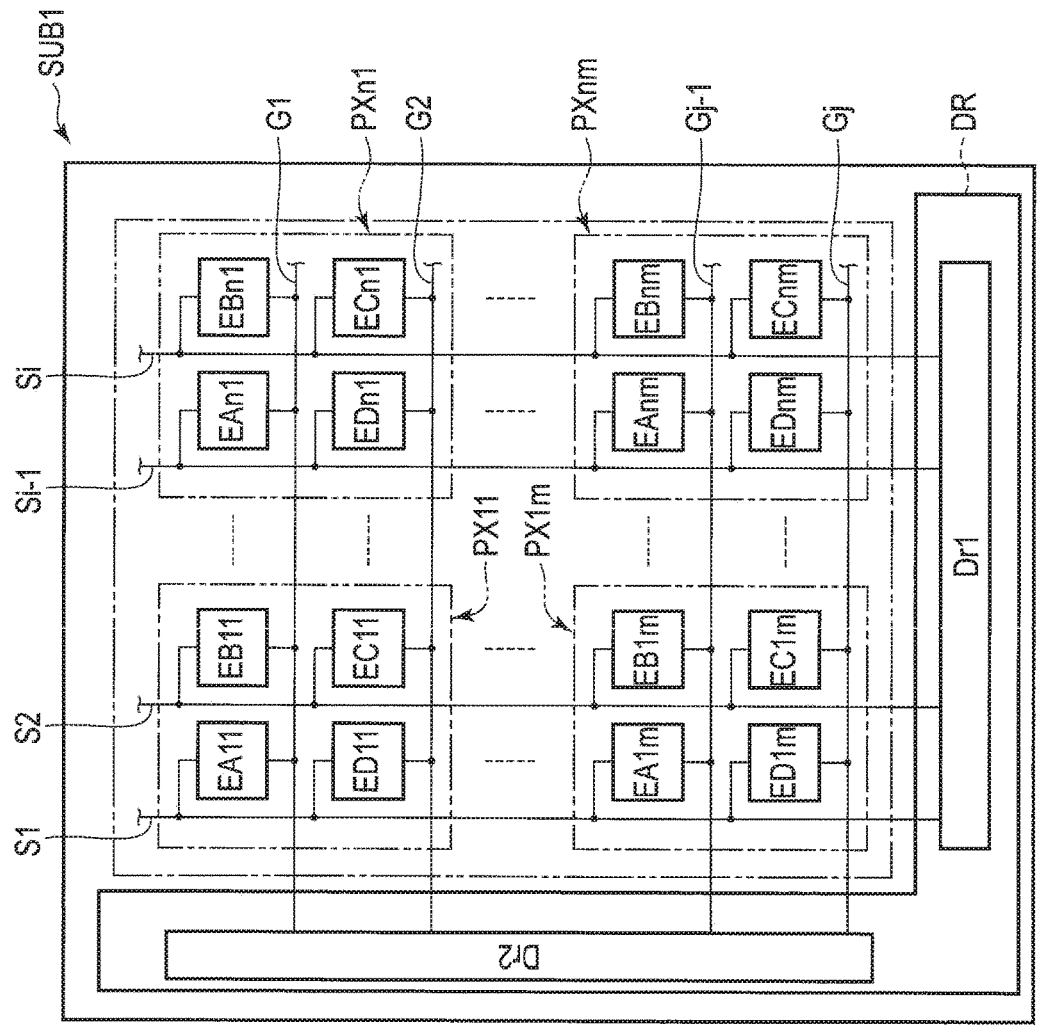
F I G. 2

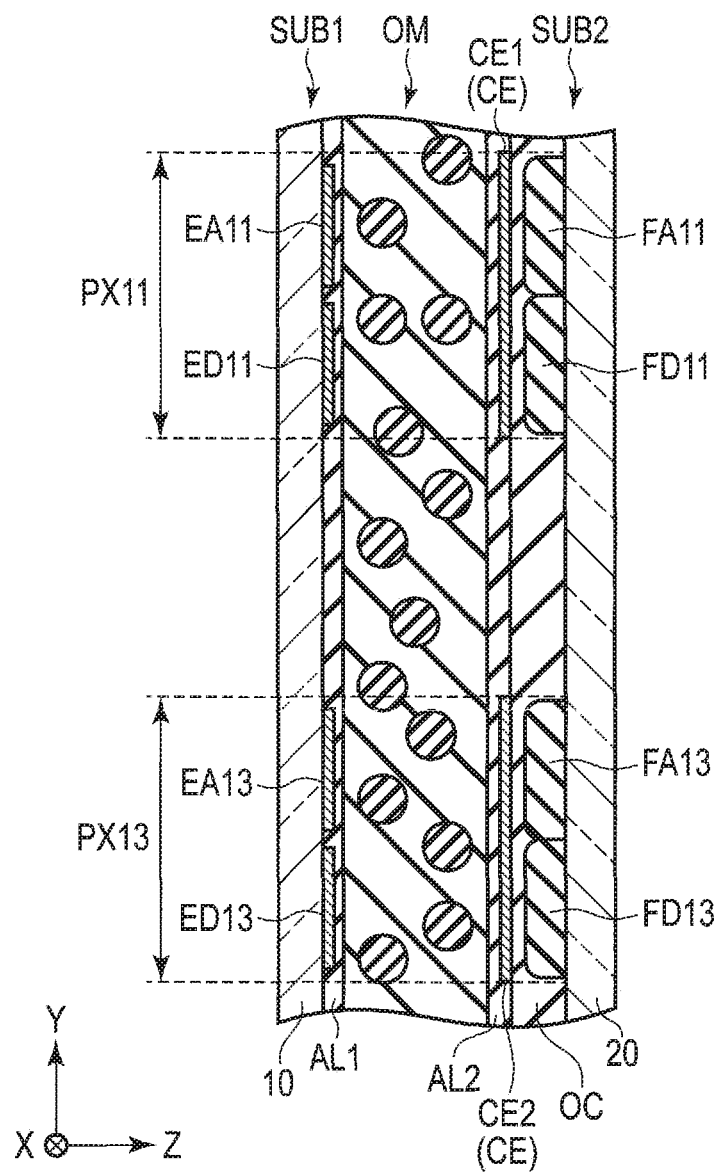
F I G. 4

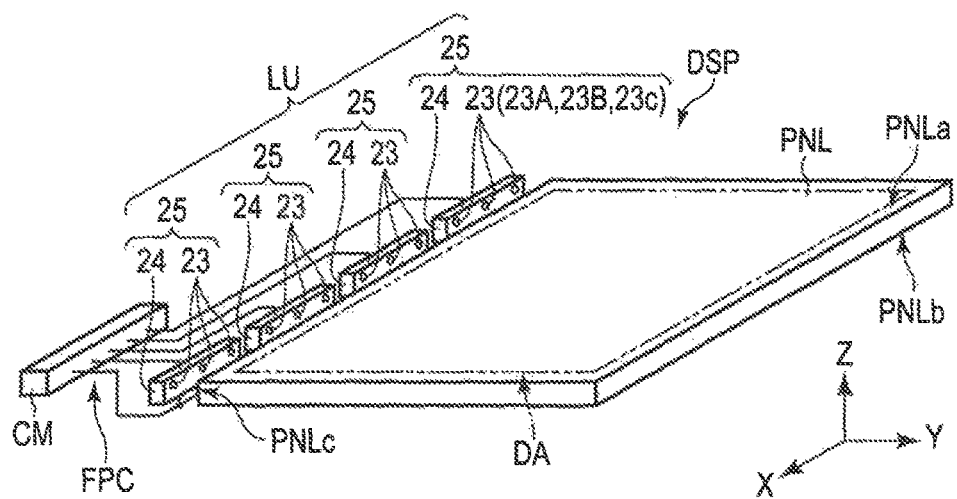
F I G. 6
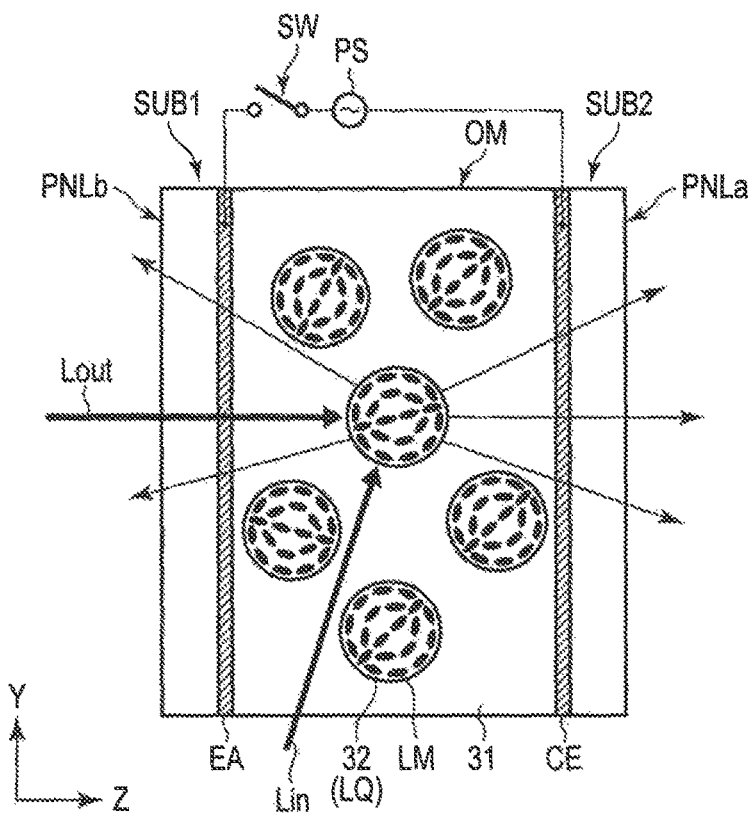
F I G. 7

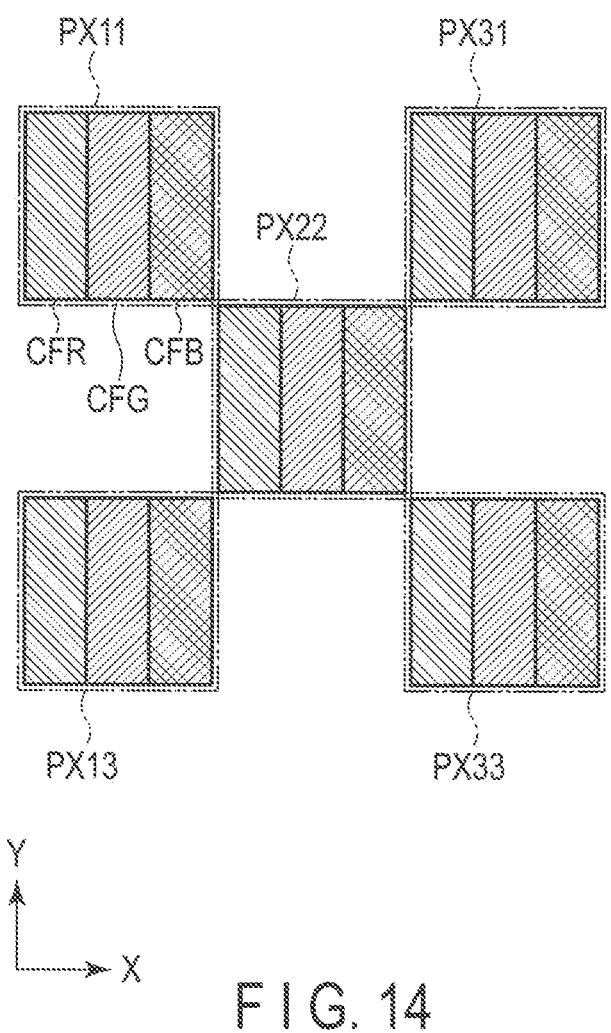
F I G. 14

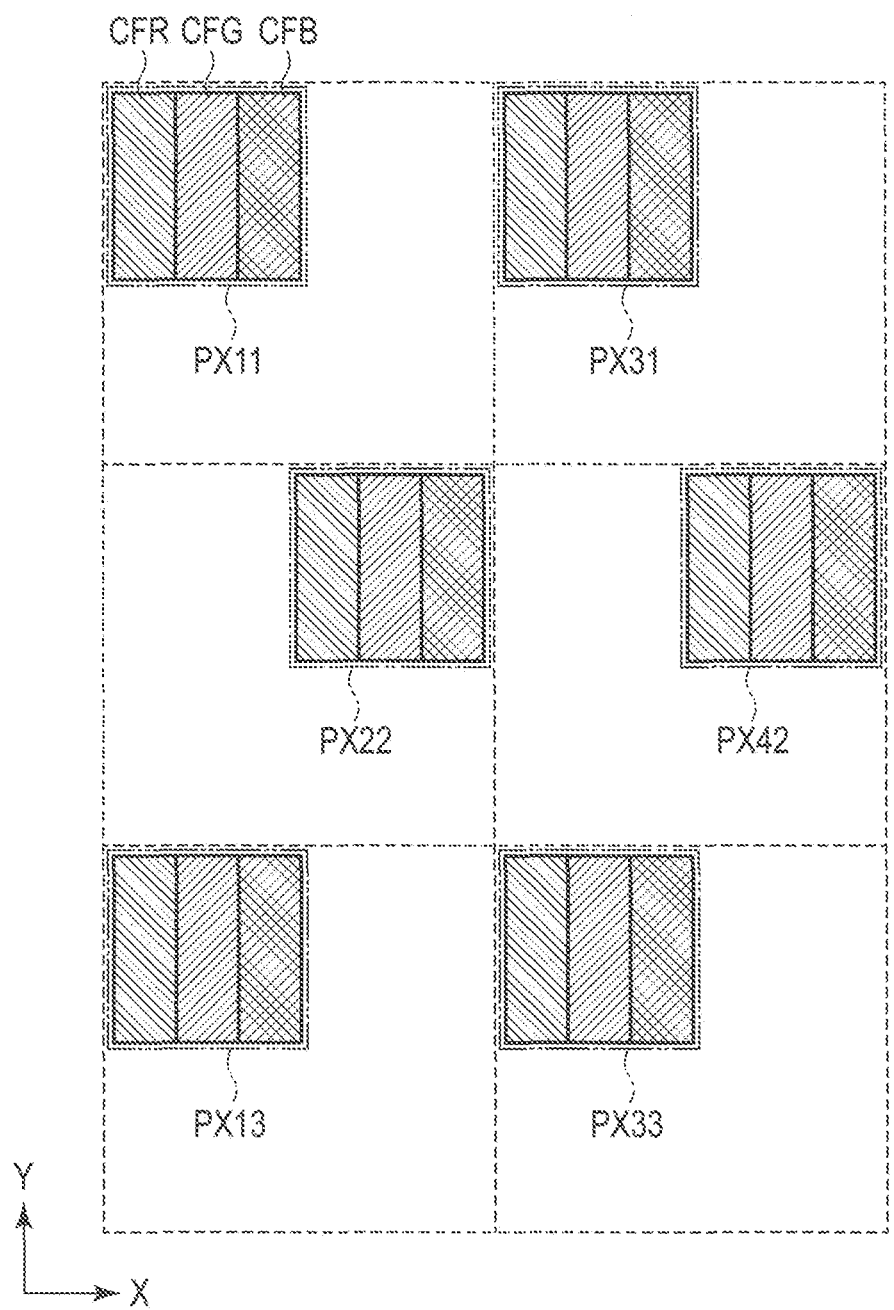
F I G. 15

| | Mode1 | Mode2 | Mode3 |
|---|---|---|---|
| Lout | High | Low | 0 |
| LU (R,G,B) | OFF | ON (All turned on) | ON (Sequentially turned on) |

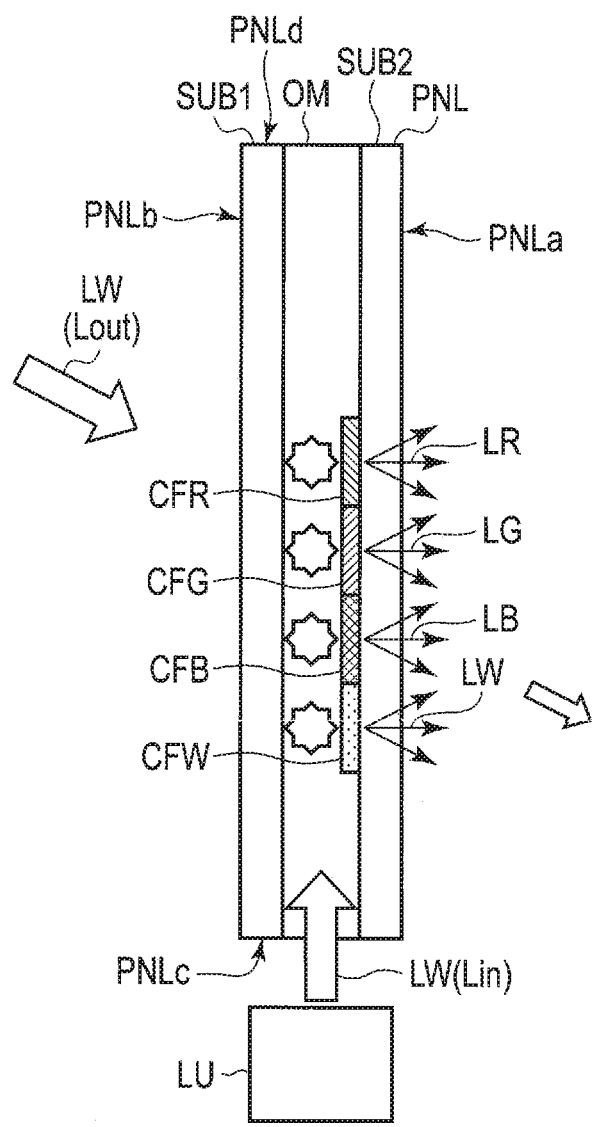
F I G. 18

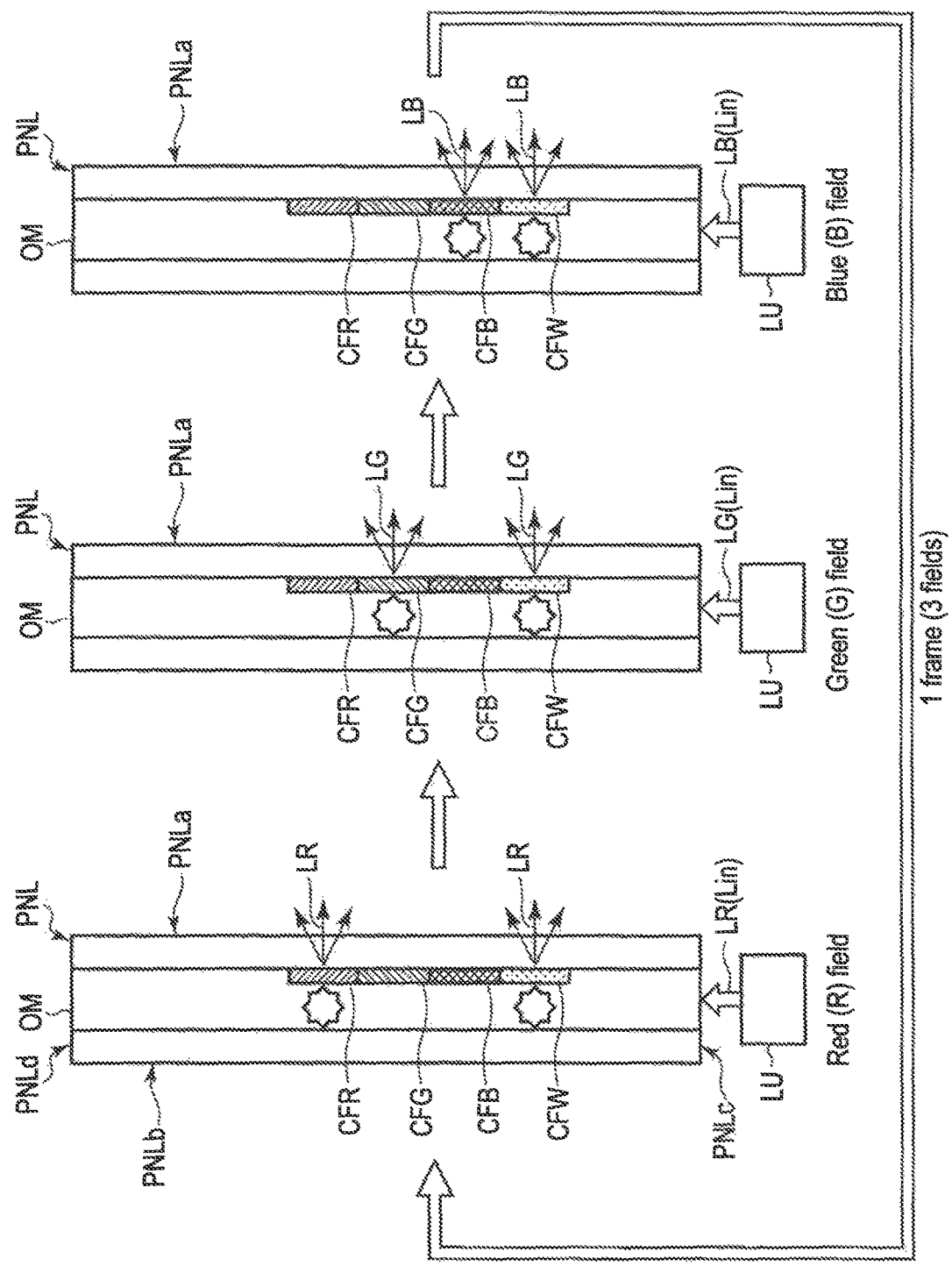
F I G. 19

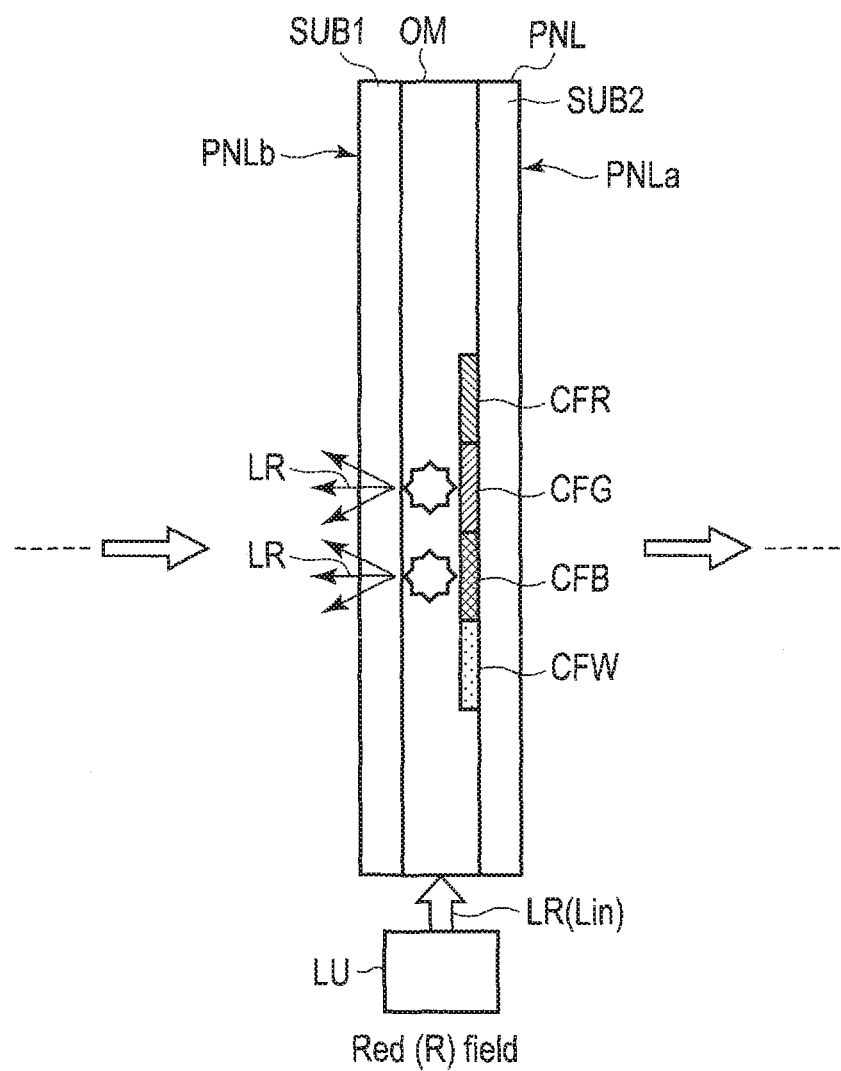
F I G. 20

| Light source | Color filter | Expression |
|---|---|---|
| Blue | Red | OFF |
| | Green | OFF |
| | Blue | Blue |
| Yellow | Red | Red |
| | Green | Green |
| | Blue | OFF |
| Green | Red | OFF |
| | Green | Green |
| | Blue | OFF |
| Magenta | Red | Red |
| | Green | OFF |
| | Blue | Blue |
| Red | Red | Red |
| | Green | OFF |
| | Blue | OFF |
| Cyan | Red | OFF |
| | Green | Green |
| | Blue | Blue |

F I G. 21

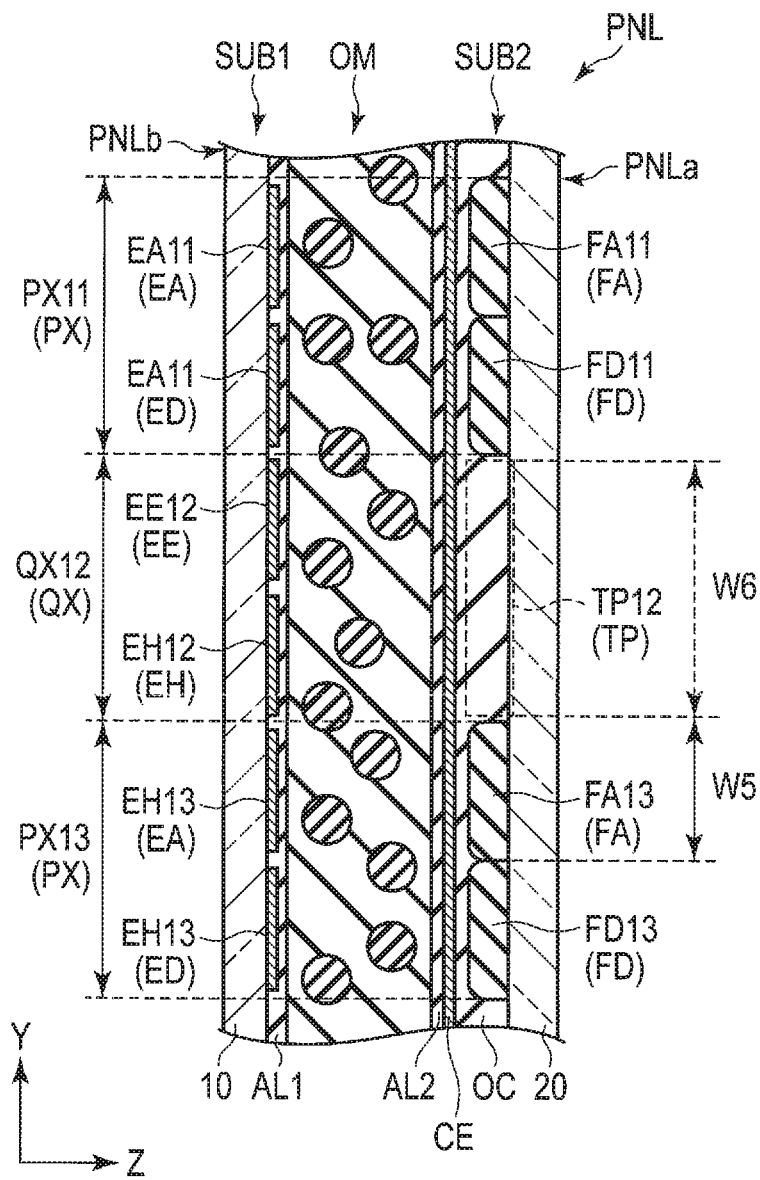
F I G. 24

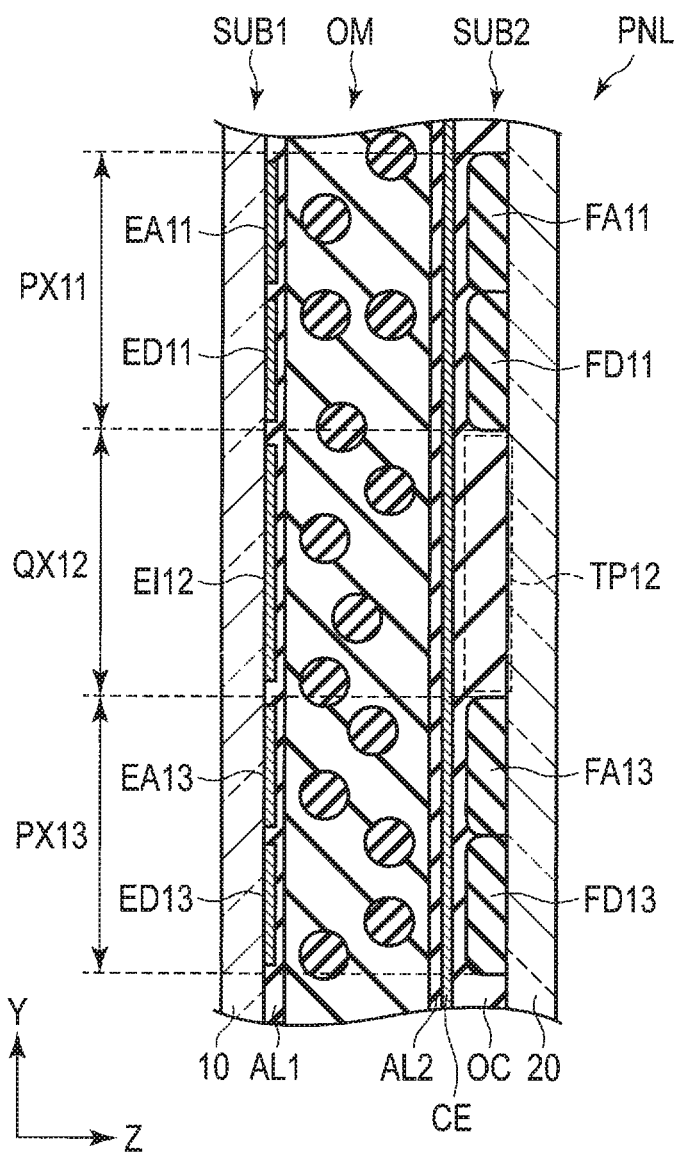
F I G. 26

DISPLAY DEVICE

CROSS-REFERENCE TO RELATED APPLICATIONS

This application is based upon and claims the benefit of priority from Japanese Patent Application No. 2016-144689, filed Jul. 22, 2016, the entire contents of which are incorporated herein by reference.

FIELD

Embodiments described herein relate generally to a display device.

BACKGROUND

Transparent displays are display devices which can be viewed from an opposite side to the observer side. Various configurations of transparent displays are being researched and those comprising, for example, a liquid crystal display panel including a polarizing filter and a display panel including a self-luminous element such as an organic light-emitting diode are developed.

BRIEF DESCRIPTION OF THE DRAWINGS

FIG. 1 is a diagram showing a configuration example of a display device DSP according to an embodiment.

FIG. 2 is a diagram showing a configuration example of a first substrate SUB1 shown in FIG. 1.

FIG. 4 is a cross section showing another configuration example of the display panel PNL shown in FIG. 1.

FIG. 6 is a diagram showing a configuration example of a light source unit LU shown in FIG. 1.

FIG. 7 is a diagram schematically showing the display panel PNL when a light-modulating layer OM indicates light dispersibility.

FIG. 14 is a diagram showing still another example of arrangement of color filters.

FIG. 15 is a diagram showing still another example of arrangement of color filters.

FIG. 18 is a diagram illustrating a behavior of the display device DSP in a second display mode shown in FIG. 17.

FIG. 19 is a diagram illustrating a behavior of the display device DSP in a third display mode shown in FIG. 17.

FIG. 20 is a diagram illustrating an example of application of the third display mode illustrated in FIG. 19.

FIG. 21 is a table indicating colors of emitted light from a light source and colors expressible by the display device DSP from the emitted light.

FIG. 24 is a diagram showing a first modification of the display device DSP according to this embodiment.

FIG. 26 is a diagram showing a second modification of the display device DSP according to this embodiment.

DETAILED DESCRIPTION

Figure 3:
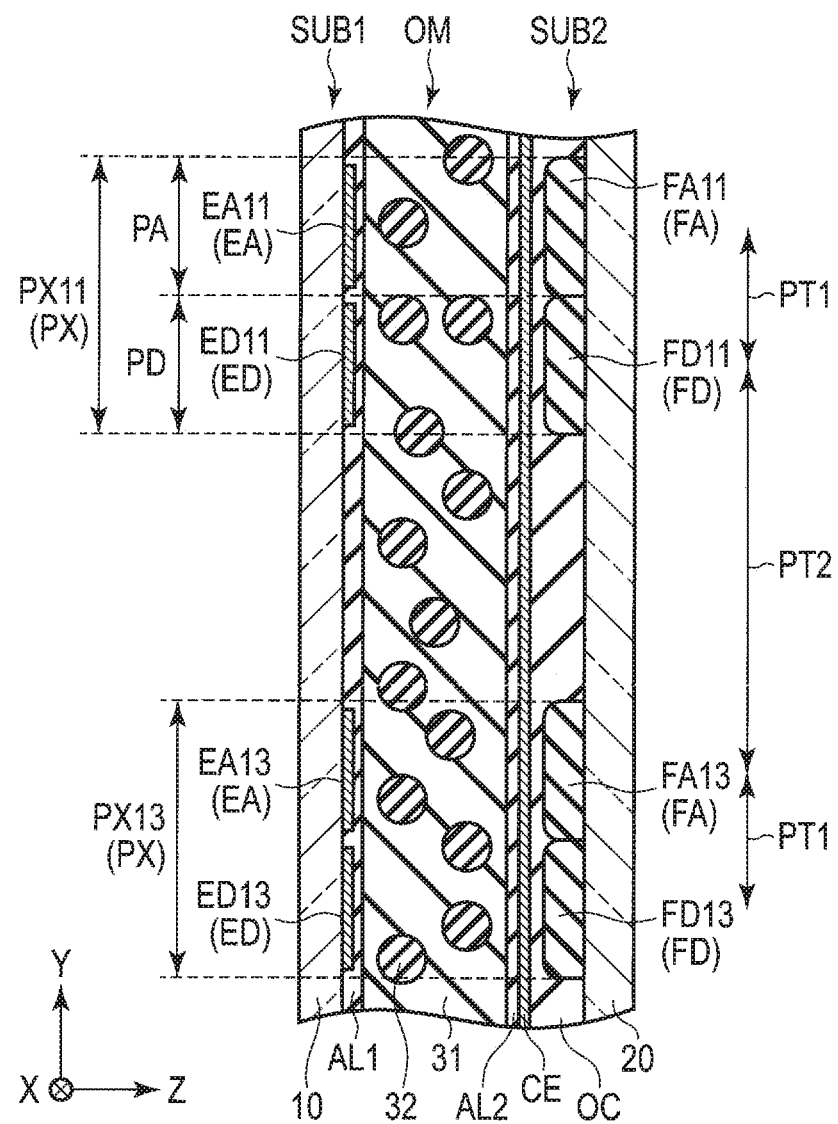
FIG. 3 is a cross section showing a configuration example of a display panel PNL shown in FIG. 1.

In general, according to one embodiment, a display device comprises: a first substrate having light transmissivity; a second substrate opposing the first substrate and having light transmissivity; a light-modulating layer arranged between the first substrate and the second substrate; a light source unit which illuminates the light-modulating layer from an outer side of a position which opposes a display area which displays images, along a normal direction; first to third color filters of different colors of red, green and blue, respectively, arranged on the first substrate; and first to third electrodes which oppose the first to third color filters, respectively, the light-modulating layer being able to change light dispersibility of each of regions which oppose the first to third color filters according to the electric field produced by each respective one of the first to third electrodes.

According to another embodiment, a display device comprises: a first substrate having light transmissivity; a second substrate opposing the first substrate and having light transmissivity; a light-modulating layer arranged between the first substrate and the second substrate; a light source unit which illuminates the light-modulating layer from an outer side of a position which opposes a display area which displays images, along a normal direction; first to third color filters of different colors of red, green and blue, respectively, arranged on the first substrate; a fourth color filter of a same color as that of one of the first to third color filters, arranged on the first substrate; a transparent member located between the third color filter and the fourth color filter and being larger in area than the third color filter; first to fourth electrodes which oppose the first to fourth color filters, respectively; and a fifth electrode that opposes the transparent member, the light-modulating layer being able to change light dispersibility of each of regions which oppose the first to fifth color filters according to the electric field produced by each respective one of the first to fifth electrodes.

Embodiments will be described hereinafter with reference to the accompanying drawings. The disclosure is merely an example, and proper changes within the spirit of the invention, which are easily conceivable by a skilled person, are included in the scope of the invention as a matter of course.

In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

FIG. 1 is a diagram showing a configuration example of a display device DSP according to an embodiment.

In the example illustrated, the first direction X is defined as that along short sides of the display panel PNL. The second direction Y is defined as that along long sides of the display panel PNL and orthogonal to the first direction X. The third direction Z is orthogonal to the first direction X and also the second direction Y, and is defined as that along a normal of the display panel PNL. The angle between the directions X, Y and Z is not limited to 90°, but they may cross each other at any degrees other than 90°. Note that the display panel PNL may comprise long sides along the first direction X and short sides along the second direction Y.

The display device DSP comprises a display panel PNL and a light source unit LU. The display panel PNL includes a display area DA which displays images and a non-display area NDA which surrounds the display area DA as a frame-like fashion. The light source unit LU illuminates the inside of the display panel PNL, and is located on an outer side of a position which opposes the display area DA along the third direction Z. In the example illustrated, the light source unit LU opposes a side surface PNLc of the display panel PNL along the second direction Y.

The display panel PNL comprises a first substrate SUB1 and a second substrate SUB2, both having a light-transmissivity. The first substrate SUB1 and the second substrate SUB2 oppose each other along the third direction Z. Further, as will be described later, a light-modulating layer OM is arranged between the first substrate SUB1 and the second substrate SUB2.

A plurality of pixels PX (PX11, . . . , PXnm) are arranged in the display area DA. One pixel PX corresponds to the minimum unit of display. With reference to, for example, a pixel PX11, pixels PX11, . . . , PXn1 are arranged in this order along the first direction X. Further, pixels PX11, . . . , PX1m are arranged in this order along the second direction Y. The pixel PX11 is located on a side separated from the light source unit LU, and the pixel PX1m is located on a side close to the light source unit LU. In the example illustrated, a pixel PXxy comprises four sub-pixels PAxy, PBxy, PCxy and PDxy. Note that x is a positive integer of 1 to n, and y is a positive integer of 1 to m. In the following description, the sub-pixels PAxy, PBxy, PCxy and PDxy will be referred to, generally, as sub-pixels PA, PB, PC and PD, respectively.

A pixel PXxy is quadrangular, for example, and the sub-pixel PAxy is adjacent to the sub-pixel PBxy along the first direction X, and is adjacent to the sub-pixel PDxy along the second direction Y. The sub-pixel PCxy is located at a diagonal position to the sub-pixel PAxy in the pixel PXxy, adjacent to the sub-pixel PDxy along the first direction X, and adjacent to the sub-pixel PBxy along the second direction Y.

In a region corresponding to the sub-pixel PAxy of the second substrate SUB2, a color filter FAxy is disposed. Similarly, in a region of the second substrate SUB2, which corresponds to the sub-pixel PBxy, a color filter FBxy is disposed, and a color filter FCxy is disposed in an region corresponding to the sub-pixel PCxy, and a color filter FDxy is disposed in a region corresponding to the sub-pixel PDxy. That is, the pixel PXxy comprises the color filters FAxy, FBxy, FCxy and FDxy. The relative positions of the color filters FAxy, FBxy, FCxy and FDxy with respect to each other are the same as those of the sub-pixels PAxy, PBxy, PCxy and PDxy. In the following descriptions, the color filters FAxy, FBxy, FCxy and FDxy will be referred to, generally, as color filters FA, FB, FC and FD, respectively.

For example, the sub-pixels PA are red (R) pixels which display red, and the color filters FA are red (R) color filters which transmit red light. The sub-pixels PB are green (G) pixels which display green, and the color filters FB are green (G) color filters which transmit green light. The sub-pixels PC are blue (B) pixels which display blue, and the color filters FC are blue (B) color filters which transmit blue light. The sub-pixels PD are white (W) pixels which display white, and the color filters FD are white (W) color filters which transmit white light. The W color filters may be of a type which emits lightly colored light for the purpose of adjusting the hue of the light which transmits the display panel PNL. Note that the sub-pixels PA are not limited to R pixel, but may be any one of G, B and W pixels, for example. Similarly, the sub-pixels PB may be one of R, B and W pixels, the sub-pixels PC may be one of R, G and W pixels, and the sub-pixels PD may be one of R, G and B pixels.

The R, G and B color filters are formed from, for example, resins colored by red, green and blue color material, respectively. The W color filters are each formed from a colorless transparent resin or a lightly colored resin. It suffices if the regions corresponding to the W pixels transmit white light, and therefore the W color filters may be omitted.

FIG. 2 is a diagram which shows a configuration example of the first substrate SUB1 shown in FIG. 1.

The first substrate SUB1 comprises a plurality of electrodes in a region corresponding to the display area DA, and drivers DR in a region corresponding to the non-display area NDA.

Electrodes EAxy are arranged on regions corresponding to the sub-pixels PAxy. Similarly, electrodes EBxy are arranged on regions corresponding to the sub-pixels PBxy, electrodes ECxy are arranged on regions corresponding to the sub-pixels PCxy, and electrodes EDxy are arranged on regions corresponding to the sub-pixels PDxy. That is, the pixels PXxy each comprise electrodes EAxy, EBxy, ECxy and EDxy. Further, the electrodes EAxy oppose the color filters FAxy, respectively, shown in FIG. 1, and the electrodes EBxy oppose the color filters FBxy shown in FIG. 1. The electrodes ECxy oppose the color filters FCxy shown in FIG. 1, and the electrodes EDxy oppose the color filters FDxy shown in FIG. 1. In the following descriptions, the electrodes EAxy, EBxy, ECxy and EDxy will be called, generically, the electrodes EA, EB, EC and ED, respectively.

The drivers DR each comprise a first driver Dr1 and a second driver Dr2. The first driver Dr1 corresponds to the data line drive circuit which supplies data signals for displaying images to the electrodes EA to ED. From the first driver Dr1, i data lines S (S1, S2, . . . , Si) are drawn out toward the display area DA. The data lines S extend along the second direction Y and are arranged along the first direction X in the display area DA. The second driver Dr2 corresponds to a scanning-line drive circuit which supplies scanning signals to control the entry of the data signals to the electrodes EA to ED. From the second driver Dr2, j scanning lines G (G1, G2, . . . , Gj) are drawn out toward the display area DA. The scanning lines G extend along the first direction X and are arranged along the second direction Y in the display area DA. For example, the data line S1 transmits a data signal to each of the pixel electrodes EA11, EB11, . . . , EAn1 and EBn1. The scanning line G1 transmits a scanning signal to each of the pixel electrode EA11, ED11, . . . , EA1m and ED1m. Note that the extending directions of the data lines S and the scanning lines G are not particularly limited, but each may be partially bent. Or, the data lines S may extend along the first direction X, and the scanning line G may extend along the second direction Y.

FIG. 3 is a cross section showing a configuration example of the display panel PNL shown in FIG. 1.

The section shown in this figure is a region including the pixels PX11 and PX13 adjacent to each other along the second direction Y, and is an example of the section along the second direction Y including the sub-pixels PA and PD. In the region corresponding to the pixel PX11, color filters FA11 and FD11 and electrodes EA11 and ED11 are arranged, and in the region corresponding to the pixel PX13, color filters FA13 and FD13 and electrodes EA13 and ED13 are arranged.

The first substrate SUB1 comprises an insulating substrate 10, electrodes A11, ED11, EA13 and ED13, and an alignment film AL1. The insulating substrate 10 is formed of a light-transmissive glass or substrate. The electrodes EA11, ED11, EA13 and ED13 are arranged on a side of the insulating substrate 10, which is close to the second substrate SUB2, and are arranged in this order along the second direction Y. The electrodes EA11, ED11, EA13 and ED13 are separated from each other along the second direction Y. The interval between the electrode ED11 and the electrode EA13 is greater than that between the electrode EA11 and the electrode ED11. The electrodes EA and ED are formed from, for example, a transparent conductive material such as indium tin oxide (ITO) or indium zinc oxide (IZO). The alignment film AL2 is disposed on a side of the insulating substrate 10 and the electrodes EA and ED, which is close to the second substrate SUB2, and covers, for example, the electrodes EA and ED.

The second substrate SUB2 comprises a insulating substrate 20, color filters FA11, FD11, FA13 and FD13, an overcoat layer OC, a common electrode CE and an alignment film AL2. The insulating substrate 20 is formed from a light-transmissive glass or resin substrate.

The color filters FA11, FD11, FA13 and FD13 are arranged on the light-modulating layer OM side of the insulating substrate 20, to oppose the electrode EA11, ED11, EA13 and ED13 along the third direction Z. The color filters FA11 and FD11 are adjacent to each other at a pitch PT1 along the second direction Y, and in contact with each other in the example illustrated. The color filters FD11 and FA13 are adjacent to each other at a pitch PT2 greater than the pitch PT1 along the second direction Y, and are separated from each other. The color filters FA13 and FD13 are adjacent to each other at the pitch PT1 in the second direction Y. Note that the term "pitch" used here is meant the interval between the centers of color filters adjacent to each other. But the pitch may mean the interval between ends of adjacent color filters on a side where the arrow of the second direction Y is indicated. The pitch PT1 corresponds to the interval between the center of the electrode EA11 and that of the electrode ED11 along the second direction Y. Further, the pitch PT2 corresponds to the interval between the center of the electrode ED11 and that of the electrode EA13 along the second direction Y.

The overcoat layer OC is disposed on the light-modulating layer OM side of the insulating substrate 20 and the color filters FA and FD, and cover, for example, the color filters FA and FD. When the W color filters are not provided, for example, the overcoat layer OC is disposed in the region corresponding to the W color filters. That is, if the color filters FA11 and FA13 in the figure are R color filters and the color filters FD11 and FD13 are W color filters, the color filters FD11 and FD13 may be omitted and the color filters FA11 and FA13 may be in contact with the overcoat layer OC located therebetween along the second direction Y.

The common electrode CE is disposed on a side of the overcoat layer OC, which is close to the first substrate SUB1, and covers, for example, the overcoat layer OC. The common electrode CE opposes the electrodes EA11, EA13, ED11 and ED13 along the third direction Z. Further, the common electrode CE extends over to a region between the pixels PX11 and PX13, and is disposed even in a region between the electrodes ED11 and EA13, which does not oppose the electrodes EA and ED along the third direction Z. The common electrode CE is formed of a transparent conductive material such as ITO or IZO. The alignment film AL2 is arranged on a side of the common electrode CE, which opposes the first substrate SUB1, and covers, for example, the common electrode CE.

The light-modulating layer OM is located between the first substrate SUB1 and the second substrate SUB2, and is adjacent to the alignment films AL1 and AL2. The light-modulating layer OM can change the light dispersibility of the regions corresponding to the sub-pixels PA, PB, PC and PD according to the sizes and directions of electric fields produced respectively by the electrodes EA, EB, EC and ED. For example, the light-modulating layer OM disperses the light entering the region corresponding to the color filter FA while voltage is not being applied to the electrode EA, whereas transmits the light entering the region corresponding to the color filter FA when voltage is being applied to the electrode EA. The light-modulating layer OM is a complex layer containing, for example, a bulk 31 and a plurality of particles 32 dispersed in the bulk 31. The particles 32 correspond to a first region and the bulk 31 corresponds to a second region.

At least one side of the bulk 31 and the particles 32 has optical (rate) anisotropy. For example, the intensity of the refractive anisotropy of the liquid crystal material (liquid crystal molecules LM, which will be described later) contained in the particles 32 is equal to the intensity of the refractive anisotropy of monomers which constitute the polymeric material of the bulk 31. Further, the bulk 31 and the particles 32 have response speeds different from each other to the electric field. For example, the bulk 31 has a strip-shaped structure or porous structure which does not respond to the electric field. Or, the bulk 31 has a strip-shaped structure or rod-shaped structure having a response speed slower than that of the particles 32. The bulk 31 is formed from a solid polymeric material obtained by, for example, polymerizing low-molecule monomers having aligning and polymerizing properties by at least one of heat and light. On the other hand, the particles 32 are formed to mainly contain, for example, a liquid crystal material, which is in a liquefied state having a molecular flexibility higher than that of the bulk 31. That is, the particles 32 have a response speed sufficiently higher than that of the bulk 31.

The alignment films AL1 and AL2 are perpendicular alignment films or horizontal alignment films, but are not particularly limited as long as they can align the liquid crystals and monomers used for the light-modulating layer OM, and they may be formed of, for example, polyimide or polyamide imide. When the monomers are polymerized while being aligned by the alignment restriction force applied from the alignment films AL1 and AL2, the molecular alignment of the bulk 31 (polymeric material) is fixed. Note that when aligning the monomers without using the alignment films AL1 and AL2, the alignment films AL1 and AL2 may be omitted. It is also possible to align the liquid crystals or monomers used for the light-modulating layer OM by, for example, applying an electric field or a magnetic field between the electrode EA and the common electrode CE or between the electrode ED and the common electrode CE. That is, the molecular alignment of the bulk 31 (polymeric material) can be fixed by polymerizing the monomers while applying an electric field or a magnetic field between the electrode EA (EB, EC or ED) and the common electrode CE. When using voltage for the alignment of liquid crystals or monomers, different electrodes may be used for aligning and driving purposes, respectively. Further, in this case, a two-frequency liquid crystal or the like, which inverts the sign of the dielectric anisotropy depending on the frequency may be used for the liquid crystal material. When using a magnetic field for aligning the liquid crystals or monomers, it is preferable to use a material having high magnetization rate anisotropy as the liquid crystals or monomer. For example, a material with a great number of benzene rings is preferable.

It suffices if the monomers with aligning and polymerizing properties, which form the bulk 31, are of a material having optical anisotropy and compoundable with liquid crystal, which, in this embodiment, should preferably be a low-molecular monomer hardenable with ultraviolet rays. When a rod-like molecular liquid crystal material is used as the particles 32, the shape of the monomer material to be used should preferably rod-like as well. From the descriptions provided above, a monomer material having polymerizing and liquid-crystalline properties should preferably be used, which should preferably have, as a polymerizing functional group, at least one functional group selected from the group consisting of an acrylate group, a methacrylate group, an acryloyloxy group, a methacryloyloxy group, a vinylether group and an epoxy group, for example. These functional groups can be polymerized by radiating ultraviolet rays, infrared rays or electron rays or heating. In order to suppress the decrease in the degree of alignment while irradiating ultraviolet rays, a liquid crystallinity material having multi-functional groups can be added as well. When the bulk 31 is formed to have the strip-shaped structure described above, a bi-functional liquid crystalline monomer should preferably be used as the material for the bulk 31. To the material for the bulk 31, a mono-functional monomer may be added to adjust the temperature which enables to indicate liquid crystallinity, or a tri- or more functional monomer can be added to improve the crosslink density.

FIG. 4 is a cross section showing another configuration example of the display panel PNL shown in FIG. 1.

The illustrated configuration example here is different from that shown in FIG. 3 in that the common electrode CE is not continuous. That is, the common electrode CE comprises segments of common electrodes CE1 and CE2 separated from each other along the second direction Y.

The common electrode CE1 opposes the electrodes EA11 and ED11. The common electrode CE2 opposes the electrodes EA13 and ED13. That is, the common electrode CE is not located in a region opposing a region between the electrodes ED11 and EA13, that is, a region between the pixels PX and PX13. Therefore, the light transmissivity of the display panel PNL can be improved in the region between the pixels PX11 and PX13.

Figure 5:
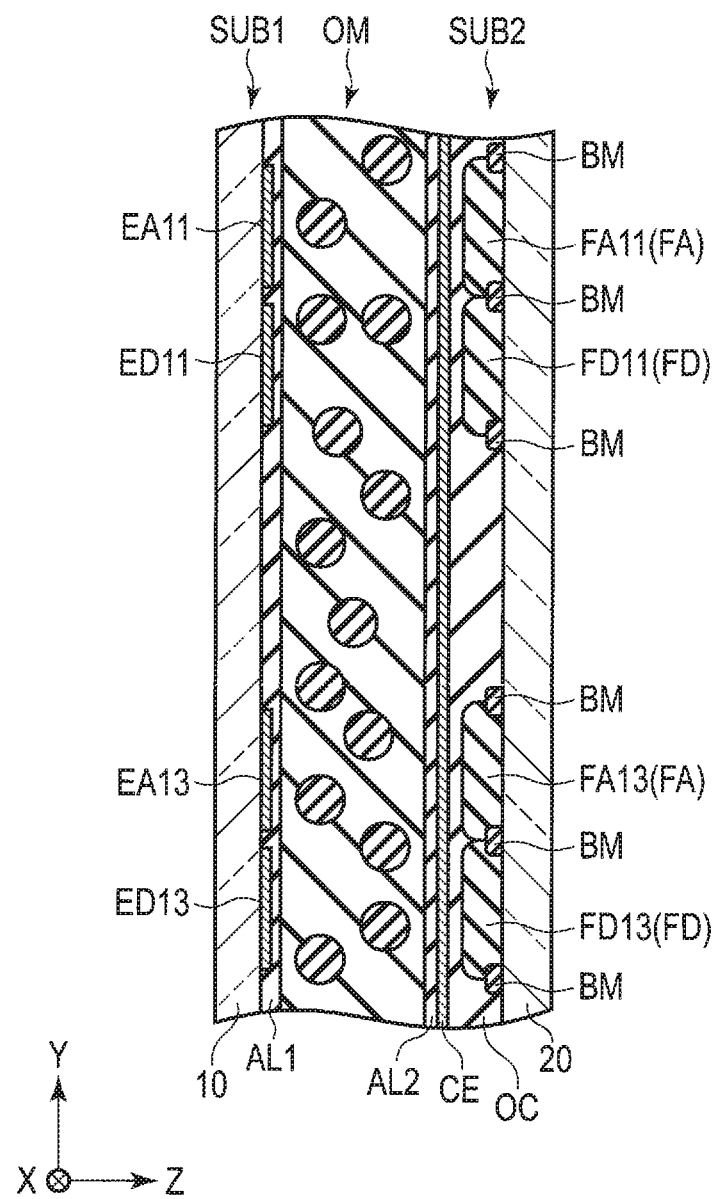
FIG. 5 is a cross section showing still another configuration example of the display panel PNL shown in FIG. 1.

FIG. 5 is a cross section showing another configuration example of the display panel PNL shown in FIG. 1.

The illustrated configuration example is different from that shown in FIG. 3 in that it comprises a plurality of light-shielding layers BM. The light-shielding layers BM have a light blocking effect, and are formed of, for example, a black resin or black metal. The light-shielding layers BM are arranged on a side of the insulating substrate 20, which opposes the first substrate SUB1. The light-shielding layers BM oppose ends of the color filters FA11, FD11, FA13 and FD13 on a second direction Y side, respectively, along the third direction Z. Note that the light-shielding layers BM may oppose ends of, for example, electrodes EA11, ED11, EA13 and ED13 on a second direction Y along the third direction Z. The light-shielding layers BM each oppose data line S and scanning line G (not shown) along the third direction Z and can block the reflection light from the wiring lines. Further, color mixture may be recognized when the modulated light between the electrode EA1 is viewed through the color filter FD11. But such color mixture can be suppressed with the light-shielding layer BM. Similarly, color mixtures in the other color filters can be suppressed by the light-shielding layer BM. Note that the color filters FA to FD may be arranged on the first substrate SUB1 side, and may be arranged on both the first substrate SUB1 and the second substrate SUB2. When the color filters FA to FD are arranged on the first substrate SUB1 side, the light-shielding layers BM may also be arranged on the first substrate SUB1 side.

FIG. 6 is a diagram showing a configuration example of a light source unit LU shown in FIG. 1.

In this figure, a main surface PNLa is a main surface of the display panel PNL, which is located on a side of the second substrate SUB2, and a main surface PNLb is a main surface of the display panel PNL, which is located on a side of the first substrate SUB1. A side surface PNLc is a surface connecting an edge side of the main surface PNLa of the display panel PNL, and an edge side of the main surface PNLb, and opposes the light source unit LU in the example illustrated. Note that, the main surface PNLa corresponds to a first main surface and the main surface PNLb corresponds to a second main surface.

The light source unit LU comprises a plurality of light sources 23 arranged in one row along the second direction Y, for example. Each of the light sources 23 is configured to emit light toward the side surface PNLc and comprises a light-emitting device on a surface opposing the side surface PNLc, for example. Examples of such a light emitting device are a light-emitting diode (LED) and a laser diode (LD).

In the light sources 23, every two or more light sources 23 are arranged on respective common substrates 24 so that the respective groups emit the light of colors different from each other, for example. In this case, one substrate 24 and a group of light sources 23 arranged on the substrate 24 form a light source block 25. The light source block 25 is configured be able to emit, for example, white light. In the example illustrated, the light source block 25 comprises three light sources 23A, 23B and 23C. The light sources 23A, 23B, and 23C are, respectively, a red (R) light source which emits red light, a green (G) light source which emits green light and a blue (B) light source which emits blue light, and when all of which are turned on, the light source block 25 can be operated as a white light source.

The substrate 24 is a circuit board on which wiring lines are formed, which electrically connects, for example, the light sources 23 and a drive circuit CM (a part of controller 100, which will be described later) which controls the drive of the light sources 23, and each light source 23 is mounted on this circuit board. The light sources 23 (specifically, light sources 23A, 23B and 23C in the light source block 25) arranged on the common substrate 24 are configured to be driven independently from each other by the drive circuit CM, but they may be driven in one batch (un-independently). Moreover, the light sources 23 arranged on separate substrates 24 (the light sources 23 in each light source block 25) are configured to be driven independently from each other by the drive circuit CM, for example, and are connected to, for example, different current paths different from each other. The light sources 23 (the light sources 23 in each light source block 25) provided on the separate substrates 24 may be driven in one batch (un-independently) by the drive circuit CM, for example.

The Light source unit LU may be provided only on one side surface PNLc of the display panel PNL, or may be provided on two side surfaces of the display panel PNL (for example, side surface PNLc and side surface opposing the side surface PNLc). As long as the light source unit LU is located on an outer side of the position which opposes the display area DA along the third direction Z, the unit need not be disposed to oppose the side surface PNLc along the second direction Y, but may be arranged, for example, to be shifted in the third direction Y from the position which opposes the side surface PNLc along the second direction Y, to emit light toward the main surface PNLb.

Figure 8:
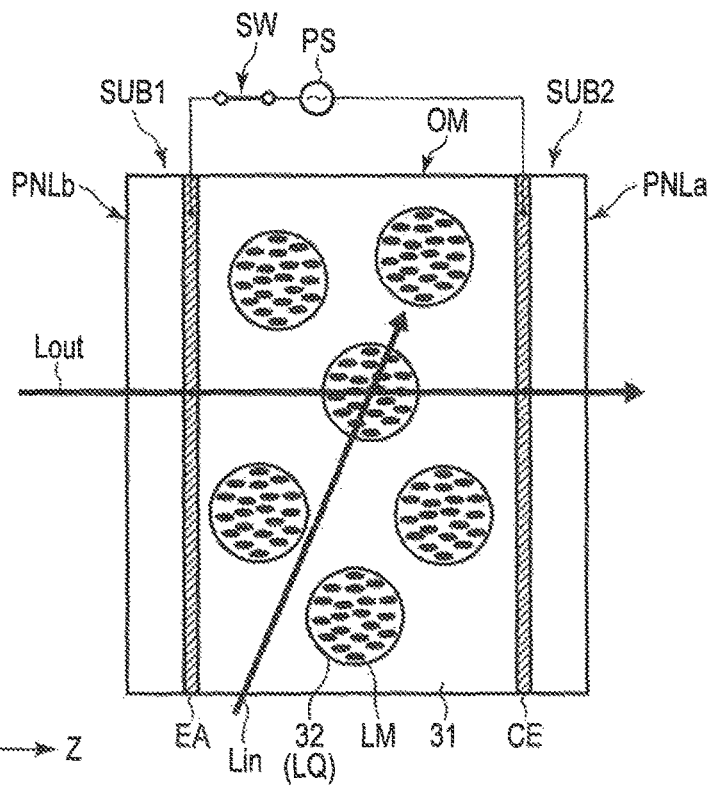
FIG. 8 is a diagram schematically showing the display panel PNL when the light-modulating layer OM indicates transmissivity.

The display device DSP displays images on the main surface PNLa by utilizing at least one of external light Lout and illumination light Lin. The external light Lout is light which enters the display panel PNL from the main surface PNLb and is equivalent to, for example, environment light such as sunlight and external illumination light. An incidence surface of the external light Lout is the main surface PNLb. The illumination light Lin is light which enters the display panel PNL from the light source unit LU. The incidence surface of the illumination light Lin is the side surfaces PNLc. A state where the light-modulating layer OM indicates light dispersibility is a display state (ON state), whereas a state where not indicating light dispersibility is a non-display state (OFF state). The display panel PNL can switch between the ON state or the display state to display images and the OFF state or the non-display state to have light transmissivity. With reference to FIGS. 7 and 8, the principle of change of the light dispersibility of the light-modulating layer OM will be schematically described. FIG. 7 shows the light-modulating layer OM in a state where an electric field is not formed, whereas FIG. 8 shows the light-modulating layer OM in a state where an electric field is formed.

FIG. 7 is a schematic diagram showing the display panel PNL when the light-modulating layer OM indicates the dispersibility.

Here, a power supply PS is electrically connected to the common electrode CE, but the switch SW of the line which connects the electrode EA to the power supply PS is open. That is, voltage is not being applied to the electrode EA and no potential difference is generated between the electrode EA and the common electrode CE.

The liquid crystal material (liquid crystal molecules LM) contained in the particles 32 (liquid crystal drop LQ) is rod-shaped molecules, for example. The liquid crystal molecules LM in the liquid crystal drop LQ are randomly aligned. Here, the refractive index of the bulk 31 to the external light Lout and the illumination light Lin and the refractive index of the particles 32 differ from each other. Therefore, the external light Lout and the illumination light Lin are refracted in the interface between the bulk 31 and the particles 32. Thereby, the external light Lout and the illumination light Lin are dispersed on the light-modulating layer OM, and the dispersed light from the external light Lout and the illumination light Lin is emitted from the main surfaces PNLa and PNLb.

FIG. 8 is a schematic diagram of the display panel PNL when the light-modulating layer OM indicates transmissivity.

Here, the switch SW is closed to apply voltage to the electrode EA from the power supply PS, and a potential difference is created between the electrode EA and the common electrode CE.

In the example illustrated, the liquid crystal molecules LM are the so-called positive type liquid crystal which has positive dielectric anisotropy. Therefore, the liquid crystal molecules LM are aligned in the liquid crystal drop LQ along the third direction Z, which is the direction of the electric field formed in the light-modulating layer OM. At this time, for example, the refractive anisotropy of the high polymers which form the bulk 31 and the refractive anisotropy of the liquid crystal molecules LM coincide each other, and the refractive index of the bulk 31 to the external light Lout and the illumination light Lin and the refractive index of the particles 32 become equivalent to each other. Therefore, the external light Lout is transmitted through the light-modulating layer OM without being substantially dispersed and is emitted from the main surface PNLa. Moreover, the illumination light Lin is also transmitted through the light-modulating layer OM without being substantially dispersed.

As described above, the light-modulating layer OM can switch between the light transmissivity and the light dispersibility by applying or not applying voltage to the electrode EA, i.e., the presence/absence of the electric field formed in the light-modulating layer OM.

Note that with the structure described with reference to FIGS. 7 and 8, the light-modulating layer OM indicates dispersibility when an electric field is not being formed. But this is only an example, and the light-modulating layer OM may be such a structure that indicates dispersibility when an electric field is being formed. As the structure in which the light-modulating layer OM indicates the dispersibility when an electric field is being formed, for example, such a structure may be considered that the bulk 31 has a strip-shaped structure in which high polymers extend along the second direction Y by the molecular alignment and the liquid crystal molecules LM are of a negative-type liquid crystal having negative dielectric anisotropy aligned along the strip-shaped structure of the bulk 31. With such a structure, when an electric field is not being formed, the liquid crystal molecules LM are aligned along the second direction Y to coincide the refractive anisotropies of the bulk 31 and the particles 32 with each other. When an electric field is being formed, the liquid crystal molecules LM are aligned along the third direction Z to make the refractive anisotropies of the bulk 31 and the particles 32 differ from each other.

According to this embodiment, the display device DSP displays images by transmitting or dispersing the external light Lout and the illumination light Lin. Here, the external light Lout can be used, and therefore, even if the external light Lout entering the main surfaces PNLa and PNLb of the display panel PNL is strong, still, the degradation of display quality can be controlled. Further, since the illumination light Lin can be used, images can be displayed even if the external light Lout is very weak. Furthermore, since the display panel PNL need not to comprise any light-absorbing layers other than the color filters, the light transmissivity thereof can be improved as compared to, for example, a liquid crystal display panel with a polarizing filter. That is, a display device with high transparency and a high visibility even under an external light environment can be provided.

Moreover, the display device DSP can also be designed to make the density of the color filters low. In other words, a pitch PT2 is set higher than a pitch PT1, and thus the transmissivity of the display panel PNL can be improved while maintaining a necessary resolution. An example of arrangement of such color filters will be described.

Figure 9:
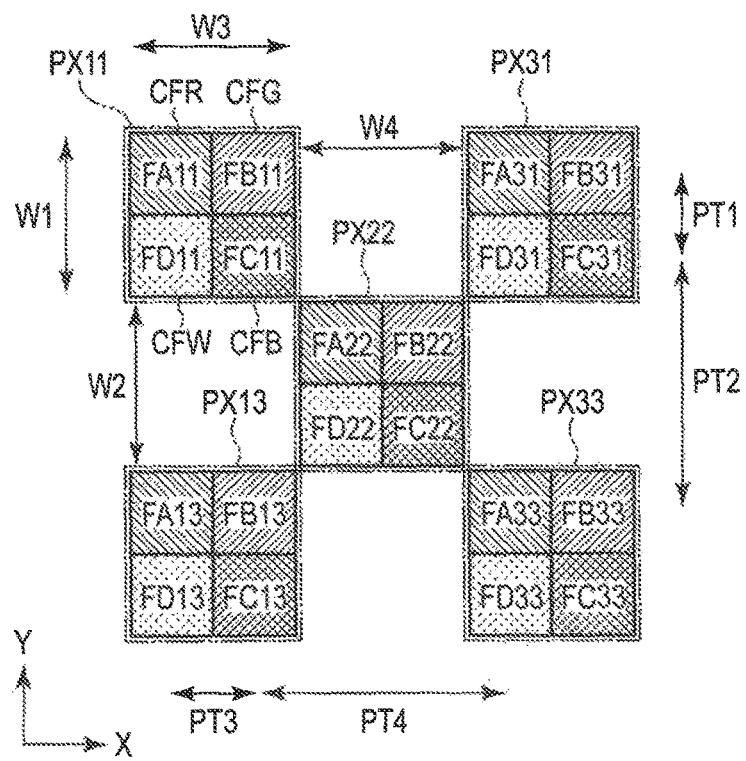
FIG. 9 is a diagram showing an example of arrangement of color filters.

FIG. 9 is a diagram showing an example of arrangement of color filters.

Pixels PX (PX11, PX31, PX22, PX13 and PX33) each comprise a red color filter CFR, a green color filter CFG, a blue color filter CFB and a white color filter CFW, as illustrated in FIG. 1. The red color filter CFR is a region hatched by lines downwardly slanting to the right, the green color filter CFG is a region hatched by lines upwardly slanting to the right hatched which rises towards the right, the blue color filter CFB is a region illustrated with a lattice pattern, and the white color filter is a region illustrated with a CFW dot pattern.

The pixels PX are each a quadrangular pixel having a width W1 along the second direction Y and a width W3 along the first direction X. The pixels PX11 and PX31 are arranged on one same straight line along the first direction X with a gap W4 therebetween. The pixels PX11 and PX13 are arranged on one straight line along the second direction Y with a gap W2 therebetween. That is, respective opposing ends of the red color filter CFR of the pixel PX31 and the green color filter CFG of the pixel PX11 face each other with a gap W4 therebetween. Further, respective opposing ends of the green color filter CFG of the pixel PX13 and the blue color filter CFB of pixel PX11 face each other with the gap W2 therebetween. The pixels PX13 and PX33 are arranged on one straight line along the first direction X with the gap W4 therebetween. The pixels PX31 and PX33 are arranged on one straight line along the second direction Y with the gap W2 therebetween.

The gap W4 is equal to the width W3 and the gap W2 is equal to the width W1. That is, the pixels PX are arranged with gaps each equivalent to the size of one pixel along the first direction X and the second direction Y. In terms of the pitch between color filters, the pitch PT2 of the color filters provided in different pixels and adjacent to each other along the second direction Y is three times the pitch PT1 of the color filters arranged in the same pixel and adjacent to each other along the second direction Y. Further, the pitch PT4 of the color filters provided in different pixels and adjacent to each other along the first direction X is three times the pitch PT3 of the color filters arranged in the same pixel and adjacent to each other along the first direction X.

The pixel PX22 is located between the pixels PX11 and PX33 and between the pixels PX31 and PX13. A corner of the red color filter CFR of the pixel PX22 is adjacent to a corner of the blue color filter CFB of the pixel PX11. A corner of the green color filter CFG of the pixel PX22 is adjacent to a corner of the white color filter CFW of the pixel PX31. A corner of the blue color filter CFB of the pixel PX22 is adjacent to a corner of the red color filter CFR of the pixel PX33. A corner of the white color filter CFW of the pixel PX22 is adjacent to a corner of the green color filter CFG of the pixel PX13. That is, the pixel PX22 is not located between the pixels PX11 and PX31, between the pixels PX11 and PX13, between the pixels PX33 and PX31, or between pixels PX33 and PX13.

With such a structure in which the pixels PX are arranged in a checkered shape, it is possible to suppress attenuation of light emitted from the light source unit LU and illuminating the region corresponding to the pixel PX11, which is caused as the light disperse in the region corresponding to the pixel PX22. That is, the non-uniformity in display, which is dependent on the distance from light source unit LU, can be suppressed in the display area DA and the display quality of the display device DSP can be improved.

Figure 10:
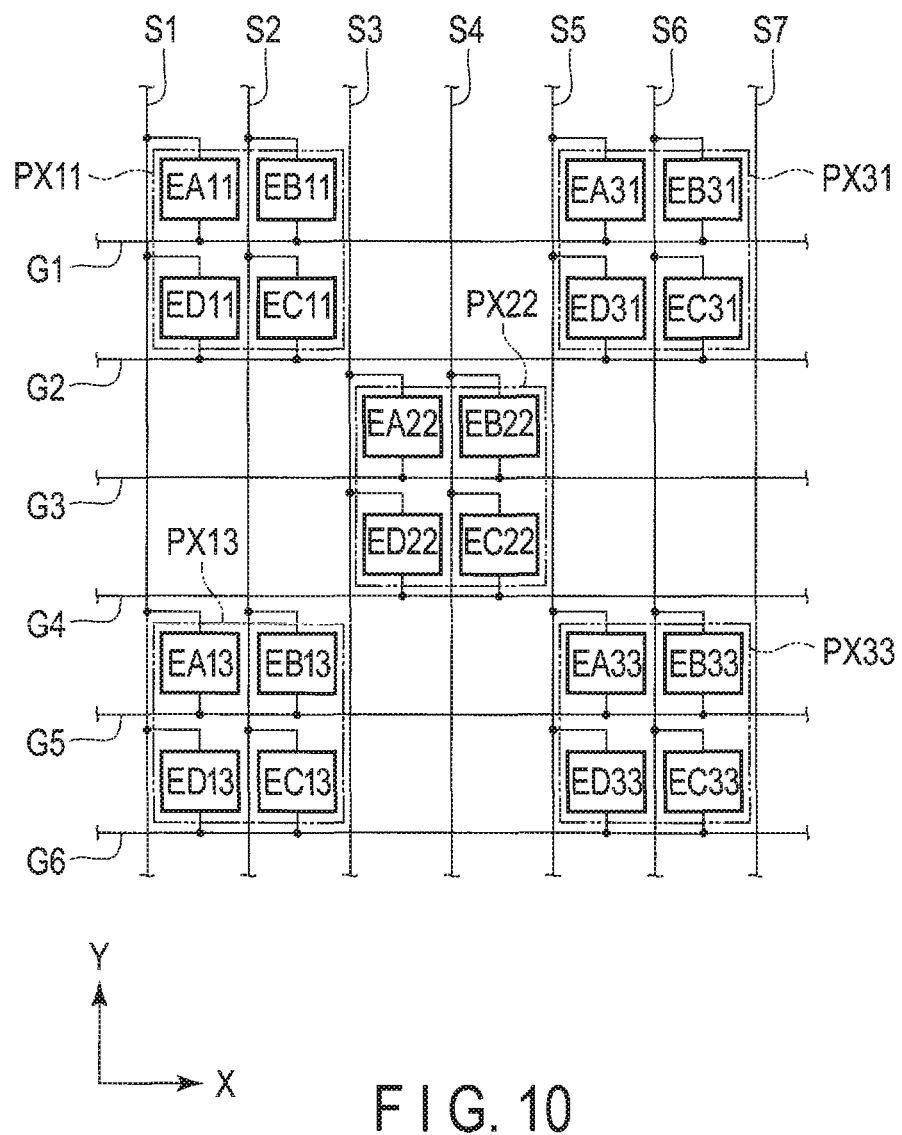
FIG. 10 is a diagram showing a example of arrangement of data lines S and scanning lines G corresponding to the example of arrangement of the color filters shown in FIG. 9.

FIG. 10 is a diagram showing an example of arrangement of data lines S and scanning lines G, corresponding to that of the color filters shown in FIG. 9. As electrodes respectively opposing the red color filter CFR, the green color filter CFG, the blue color filter CFB and the white color filter CFW, the pixel PX11 comprises electrodes EA11, EB11, EC11 and ED11, the pixel PX31 comprises electrodes EA31, EB31, EC31 and ED31, the pixel PX22 comprises electrodes EA22, EB22, EC22 and ED22, the pixel PX13 comprises electrodes EA13, EB13, EC13 and ED13, and the pixel PX33 comprises electrodes EA33, EB33, EC33 and ED33.

To the electrodes EA11, ED11, EA13 and ED13, the data signal is supplied via the data line S1. To the electrodes EB11, EC11, EB13 and EC13, the data signal is supplied via the data line S2. To the electrodes EA22 and ED22, the data signal is supplied via the data line S3. To the electrodes EB22 and EC22, the data signal is supplied via the data line S4. To the electrode EA31, ED31, EA33 and ED33, the data signal is supplied via the data line S5. To the electrodes EB31, EC31, EB33 and EC33, the data signal is supplied via the data line S6.

The driving of the electrodes EA11, EB11, EA31 and EB31 is controlled via the scanning line G1. The driving of the electrodes ED11, EC11, ED31 and EC31 is controlled via the scanning line G2. The driving of the electrodes EA22 and EB22 is controlled via the scanning line G3. The driving of the electrodes ED22 and EC22 is controlled via the scanning line G4. The driving of the electrode EA13, EB13, EA33 and EB33 is controlled via the scanning line G5. The driving of the electrodes ED13, EC13, ED33 and EC33 is controlled via the scanning line G6.

Figure 11:
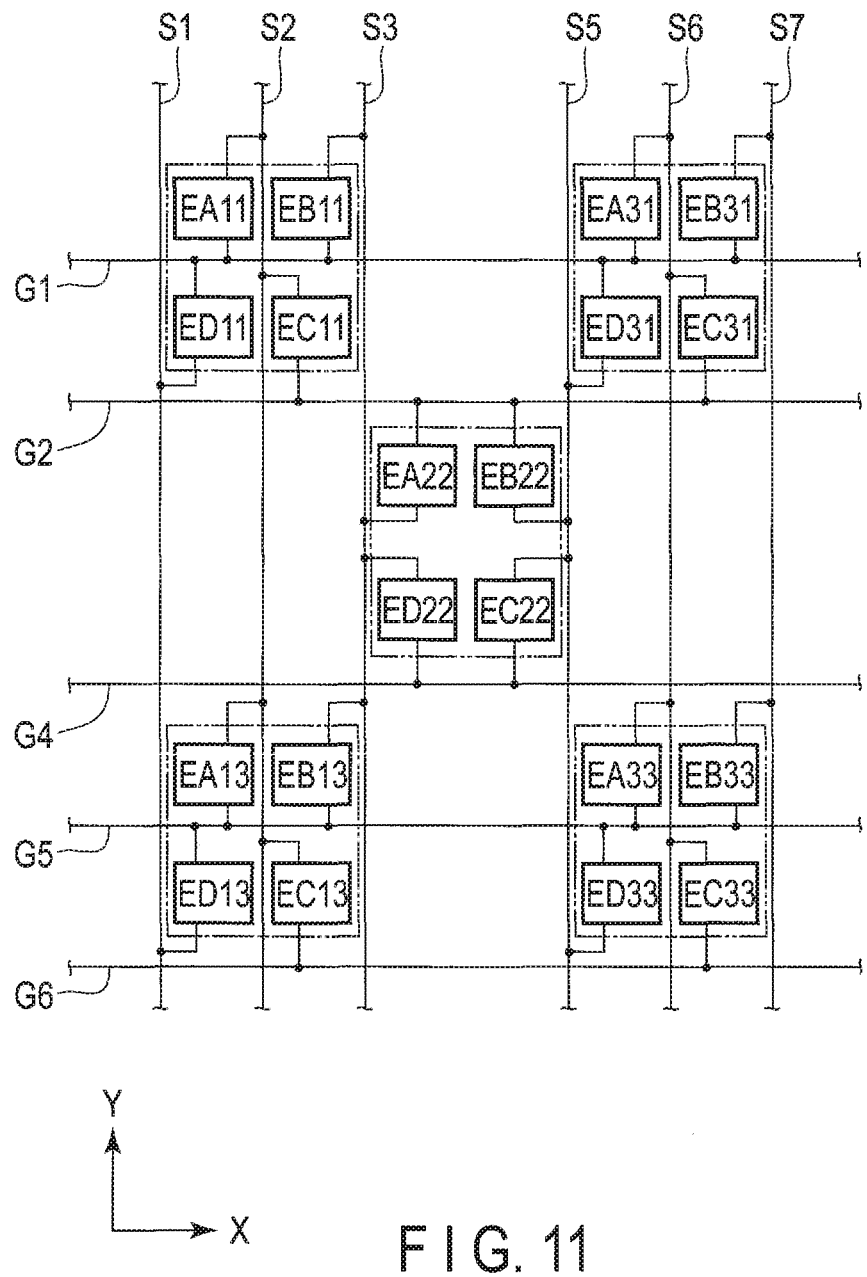
FIG. 11 is a diagram showing another example of arrangement of data lines S and scanning lines G corresponding to the example of arrangement of the color filters shown in FIG. 9.

FIG. 11 is a diagram showing another example of arrangement of data lines S and scanning lines G, corresponding to the example of arrangement of the color filters shown in FIG. 9.

This example of arrangement is different from that shown in FIG. 10 in the point that the data line S4 and scanning line G3 are not provided. In the example illustrated, the driving of the electrodes ED11, EA11, EB11, ED31, EA31 and EB31 is controlled via the scanning line G1. The driving of the electrodes EC11, EA22, EB22 and EC31 is controlled via the scanning line G2. The driving of the electrodes ED22 and EC22 is controlled via the scanning line G4. The driving of the electrodes ED13, EA13, EB13, ED33, EA33 and EB33 is controlled via the scanning line G5. The driving of the electrodes EC13 and EC33 is controlled via the scanning line G6. Moreover, to the electrodes ED11 and ED13, the data signal is supplied via the data line S1. To the electrodes EA11, EC11, EA13 and EC13, the data signal is supplied via the data line S2. To the electrode EB11, EA22, ED22, and EB13, the data signal is supplied by the data line S3. To the electrodes ED31, EB22, EC22 and ED33, the data signal is supplied via the data line S5. To the electrodes EA31, EC31, EA33 and EC33, the data signal is supplied via the data line S6. To the electrodes EB31 and EB33, the data signal is supplied via the data line S7.

According to this example of arrangement, the number of data lines S and the number of scanning lines G can be reduced, thereby making it possible to enhance the transmissivity of the display panel PNL.

Figure 12:
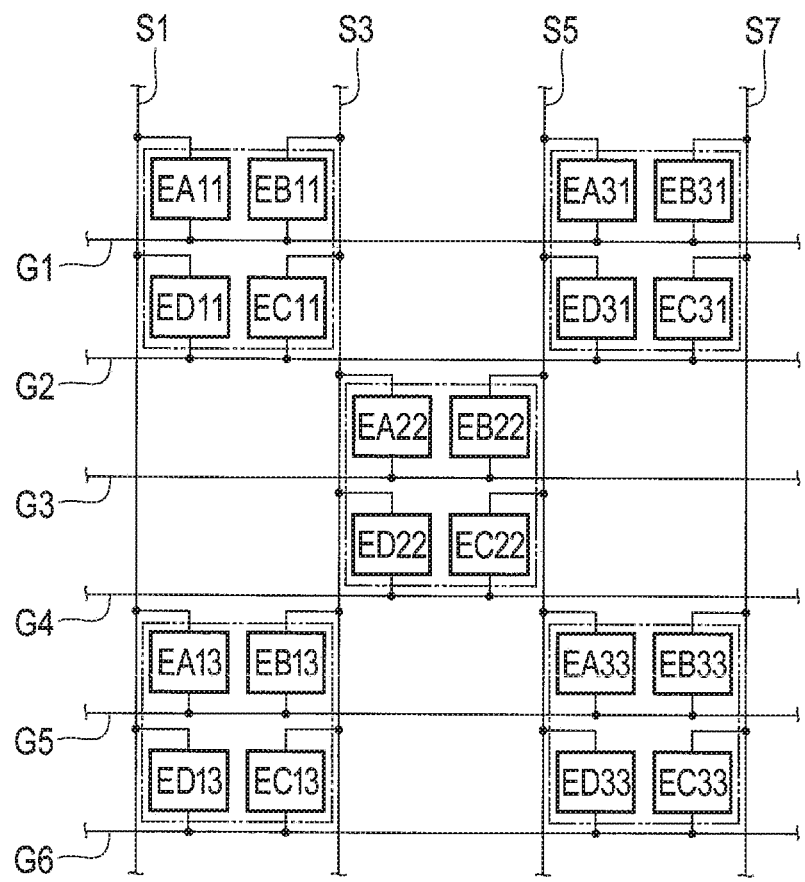
FIG. 12 is a diagram showing still another example of arrangement of data lines S and scanning lines G corresponding to the example of arrangement of the color filters shown in FIG. 9.

FIG. 12 is a diagram of another example of arrangement of data lines S and scanning lines G, corresponding to that of the color filter shown in FIG. 9.

This example of arrangement is different from that shown in FIG. 10 in the point that the data line S2, S4 and S6 are not arranged. In the example illustrated, to the electrodes EB11, EC11, EA22, ED22, EB13 and EC13, the data signal is supplied via the data line S3. To the electrode EA31, ED31, EB22, EC22, EA33 and ED33, the data signal is supplied via the data line S5. To the electrodes EB31, EC31, EB33 and EC33, the data signal is supplied via the data line S7. According to this example of arrangement, the number of data lines S can be reduced.

Figure 13:
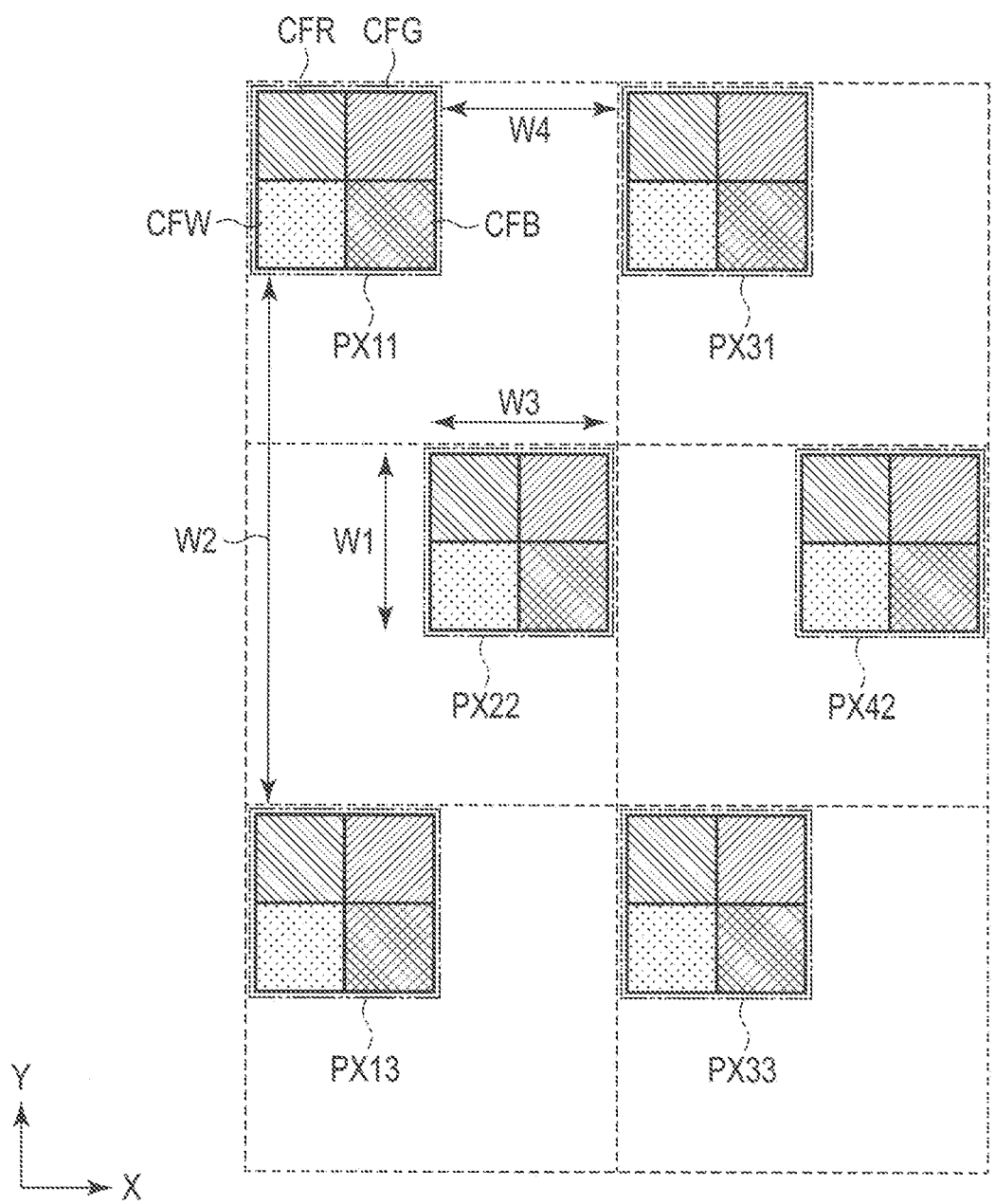
FIG. 13 is a diagram showing another example of arrangement of color filters.

FIG. 13 is a diagram showing another example of arrangement of the color filters.

This example of arrangement is different from that shown in FIG. 9 in the point that the gap W2 between pixels PX along the second direction Y is larger than the width W1 between pixels PX along the second direction Y. Here, as in the example shown in FIG. 9, the gap W4 between pixels PX along the first direction X is equivalent to the width W3 between pixels PX along the first direction X, but the gap W4 may be larger than the width W3.

In the example illustrated, the gap W2 is three times the width W1. The pixel PX22 is separated from the pixels PX11 and PX13 at an equal interval. That is, the distance between a corner of the blue color filter CFB of the pixel PX11 and a respective corner of the red color filter CFR of the pixel PX22 along the second direction Y is equal to the width W1. Further, the distance between a corner of the white color filter CFW of the pixel PX22 and a respective corner of the green color filter CFG of the pixel PX13 along the second direction Y is also equal to the width W1.

Also in this example of arrangement, an advantageous effect similar to that of the example shown in FIG. 9 can be obtained. Further, the transmissivity of the display panel PNL can be improved by expanding the gap W2 greater than the width W1. The transmissivity of the display panel PNL may be improved by expanding the gap W4 greater than the width W3.

FIG. 14 is a diagram showing another example of arrangement of the color filters.

The example illustrated is different from that shown in FIG. 9 in the point that the red color filter CFR, the green color filter CFG and the blue color filter CFB each extend along the second direction Y and are arranged along the first direction X in this order.

FIG. 15 is a diagram showing another example of arrangement of the color filters.

The example illustrated is different from that shown in FIG. 13 in the point that the red color filter CFR, the green color filter CFG and the blue color filter CFB each extend along the second direction Y, and are arranged along the first direction X in this order.

An advantageous effect similar to the above can be obtained also in the examples shown in FIGS. 14 and 15. Note that the arrangement of the red color filter CFR, the green color filter CFG and the blue color filter CFB is not limited to the first direction X, but may be arranged along, for example, the second direction Y. Moreover, the white color filter CFW may be arranged in the examples shown in FIGS. 14 and 15. In that case, the white color filter CFW extends along the second direction Y, for example, and is adjacent to the red color filter CFR or the green color filter CFG along the first direction X.

In this embodiment, the display device DSP can utilize both the external light Lout and the illumination light Lin, making it possible to improve the utilization efficiency of the illumination light Lin by switching the display mode appropriately. The display mode is equivalent to, for example, the driving method for the light source unit LU or the display method for the pixels PX. Next, a system for switching the display modes and an example of each display mode will be described.

Figures 16, 17:
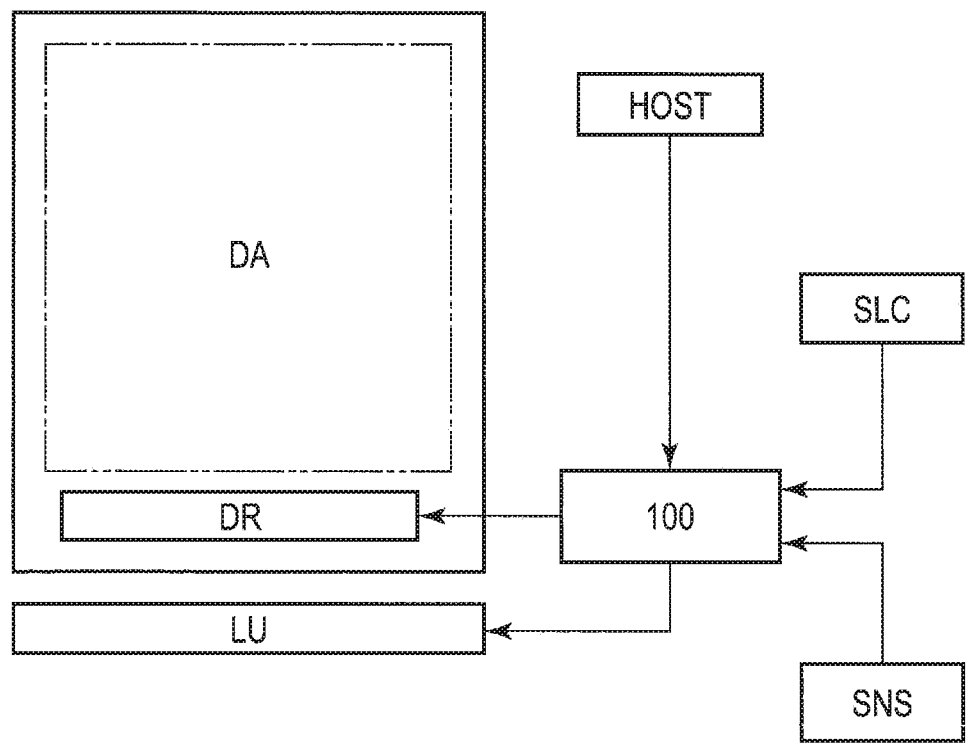
FIG. 16 is a block diagram illustrating flow of data when controlling the switching of a display mode of the display device DSP.
FIG. 17 is a diagram showing an example of the display mode of the display device DSP.

FIG. 16 is a block diagram showing a flow of data at the time of controlling the switching of the display modes of the display device DSP.

The display device DSP further comprises a host computer HOST, an external light sensor SNS, a selector SLC and a controller 100.

The host computer HOST transmits image data to the controller 100. The external light sensor SNS is an optical sensor which detects the brightness and the color of the external light Lout and transmits the acquired environmental data to the controller 100. The external light sensor SNS comprises, for example, a spectrum meter which measures the spectrum of the external light Lout or an RGB luminance sensor which measures a red (R) component, a green (G) component, and a blue (B) component of the external light Lout, separately. The RGB luminance sensor comprises, for example, a red sensor which measures the brightness of external light Lout which transmitted the red color filter, a green sensor which measures the brightness of external light Lout which transmitted the green color filter and a blue sensor which measures the brightness of external light Lout which transmitted the blue color filter. The selector SLC corresponds to a switch which can switch the selection data for an observer or the like to arbitrarily select a display mode, and transmits the entered selection data to the controller 100.

The controller 100 carries out signal processing such as conversion and correction onto image (RGB) data entered from the host computer HOST. At this time, the controller 100, for example, converts linear RGB data indicating the RGB ratio of the colors expressed in the pixels PX into gradation data indicating the luminance of the R pixel, G pixel and B pixel. The controller 100 may switch the display mode according to the environmental data entered from the external light sensor SNS, for example. Alternatively, the controller 100 may switch the display mode according to the selection data entered from the selector SLC. The image data processed according to the respective display modes are transmitted to the driver DR and the light source unit LU from the controller 100.

The controller 100 may carry out signal processing in order to reduce the power consumption in the light source unit LU. For example, The controller 100 carries out signal processing which expands the data of the dispersing intensity in each pixel PX and transmitting the signal to the driver DR. The controller 100 also carries out signal processing which reduces the data of the brightness of the light source unit LU only by the expand portion of the dispersing intensity and transmits the signal to the light source unit LU. Further, the controller 100, when converting RGB data into gradation data, carries out signal processing which assigns a common part of the RGB data to W data indicating the luminance of the W pixel. The controller 100 also carries out signal processing which expands the RGB data reduced by only the portion assigned to the W data while maintaining the ratio, thereby making it possible to improve the luminance of the pixels PX.

The controller 100 may adjust the color temperature of the display image according to the environmental data. For example, in the case where the external light Lout measured by the external light sensor SNS is tinged yellowish, if the display device DSP drives similar to the case where the external light Lout is white light, the color expressed by the pixel PX is tinged yellowish as well. In such a case, the color correction which increases the luminance of the B pixel onto the RGB data is carried out for the respective pixel PX to be able to express the original color.

FIG. 17 is a table showing an example of the display mode of the display device DSP.

The table lists the first to third display modes switched by the intensity of the luminance of the external light Lout. In this table, Mode 1 indicates the first display mode, Mode 2 indicates the second display mode, and Mode 3 indicates the third display mode. "High" indicates the state where the external light Lout is strong, "Low" indicates the state where the external light Lout is weak, and "0" indicates the state where the external light Lout is very weak or not present. Further, "OFF" indicates the turning-out of the light source unit LU, and "ON2 indicates the turning of the light source unit LU.

When the external light Lout is High, the display device DSP selects the first display mode. That is, the light source unit LU is entirely turned off and images are displayed utilizing only the external light Lout. When the external light Lout is Low, the display device DSP selects the second display mode. That is, the light source unit LU is turned on and images are displayed utilizing the external light Lout and the illumination light Lin. Note that at this time, the light source unit LU turns on all of the R light source, G light source and B light source, to function as a white light source. When the external light Lout is 0, the display device DSP selects the third display mode. That is, the light source unit LU turns on the R light source, G light source and B light source sequentially to display images utilizing only the illumination light Lin by the so-called field sequential color (FSC) system. Note that the lighting method of the light source unit LU in each display mode is not limited to this, but, for example, when the external light Lout is low, the third display mode may be selected and the light source unit LU may turn on the light sources sequentially, or when the external light Lout is 0, the second display mode may be selected and the light source unit LU may turn on all the light sources.

FIG. 18 is a diagram illustrating the behavior of the display device DSP in the second display mode shown in FIG. 17.

The external light Lout and the illumination light Lin of the white light LW enters the light-modulating layer OM. The external light Lout and the illumination light Lin are dispersed on the region opposing the red color filter CFR and the dispersed light transmits the red color filter CFR. Then, the light is emitted from the main surface PNLa as red light LR. Similarly, the external light Lout and the illumination light Lin are dispersed on the regions opposing the green color filter CFG, the blue color filter CFB and the white color filter CFW, respectively, and are emitted as green light LG, blue light LB and white light LW, respectively.

Here, let us suppose that the pixels PX each consist of only an R pixel, a G pixel and a B pixel. In this case, for displaying the white (W) component of input data, the external light Lout and the illumination light Lin are dispersed on the regions opposing the color filters CFR, CFG and CFB, respectively, and thus the W component, as a synthetic component of red light LR, green light LG and blue light LB, can be displayed. But when W pixels are provided, white light LW can be emitted by dispersing the light only in the region opposing the white color filter CFW. That is, the illumination light Lin consumed by dispersing in one pixel PX can be reduced. Further, the loss of the illumination light Lin, caused by the absorption in the red color filter CFR, the green color filter CFG and the blue color filter CFB can be reduced. Therefore, when the opposite side to the side surface PNLc facing the light source unit LU of the display panel PNL is formed as the side surface PNLd, the decrease in brightness of the illumination light Lin in a region near the side surface PNLd can be suppressed. Thereby, the display device DSP can suppress the gradient (non-uniformity in display) in the brightness according to the distance to the light source unit LU from a display position site.

Although the illustration is omitted, the light dispersed on the regions opposing the color filters CFR, CFG, CFB and CFW is emitted also from the main surface PNLb. The light emitted from the main surface PNLb also contains, for example, the light transmitted the color filters CFR, CFG and CFB and reflected by the interface of the second substrate SUB and therefore is lightly colored. Therefore, the display device DSP can display images also on the main surface PNLb side. Further, when the color filters CFR, CFG and CFB are provided on the first substrate SUB1, the display device DSP can emit the light of the colors LR, LG and LB each having a concentration substantially the same as that of the light emitted from the main surface PNLa also from the main surface PNLb. That is, the display device DSP can display images also on the main surface PNLa more clearly.

FIG. 19 is a diagram illustrating behavior of the display device DSP in the third display mode shown in FIG. 17.

In the FSC system, one frame equivalent to the period which displays one image is divided into a plurality of fields in time. The display device DSP drives sub-pixels of different colors in these fields to synthesize the colors of each field expressed in one frame for the observer to view as the color of the pixel PX. In the example illustrated, the display device DSP divides one frame into three fields, that is, a red (R) field which drives an R pixel drives, a green (G) field which drives a G pixel and a blue (B) field which drives a B pixel, and drives these fields sequentially in this order. Note here that a white (W) field which drives none of the sub-pixels may be inserted to the time of the start or end of one frame. By driving the W field before and after the RGB fields, the color mixture between frames can be suppressed.

Next, the driving of each of the R, G and B fields will be described.

In the R field, the light source unit LU emits the illumination light Lin of the red light LR. The illumination light Lin is dispersed in a region which opposes the red color filter CFR and the white color filter CFW, and is emitted as the red light LR from the surface PNLa. Although illustration is omitted, the dispersed illumination light Lin is the red light LR, red light LR of a color density substantially the same as that from the main surface PNLa is emitted also from the main surface PNLb.

In the G field, the light source unit LU emits the illumination light Lin of the green light LG. The illumination light Lin is dispersed on the regions which oppose the green color filter CFG and the white color filter CFW, and is emitted as the green light LG from the main surfaces PNLa and PNLb as in the case of the R field.

In the B field, the light source unit LU emits the illumination light Lin of the blue light LB. The illumination light Lin is dispersed on the regions which oppose the blue color filter CFB and the white color filter CFW, and is emitted as the blue light LB from the main surfaces PNLa and PNLb as in the case of the R field.

According to the above-described third display modes, the loss of the dispersed illumination light Lin, which may be caused by the absorption in the red color filter CFR, the green color filter CFG and the blue color filter CFB, can be reduced. That is, it is possible to improve the use efficiency of the light of light source unit LU. Moreover, in the R field, the illumination lights Lin is dispersed only in the regions corresponding to the R pixel and the W pixel, and the illumination light Lin is not consumed in the regions corresponding to the G pixel and the B pixel. In the G and B fields, similarly, the consumption of the illumination light Lin can be suppressed. Therefore, the display device DSP can suppress the decrease in brightness in the side surface PNLd of the illumination light Lin, thereby suppressing non-uniformity in display.

Note that even if a pixel PX consists of only an R pixel, a G pixel and a B pixel, the display by the FSC system is possible. Here, with the W pixel provided, the display device DSP can use the W pixel for display in each of the R, G and B fields, thereby making it possible to improve the brightness of each field.

FIG. 20 is a diagram showing an application example of the third display mode described with reference to FIG. 19.

In this figure, only the R field is illustrated and the G and B fields are omitted. In this display method, images are displayed by driving the R, G and B fields sequentially in a manner similar to that illustrated in FIG. 19. In the example illustrated, the display device DSP disperses, in the R field, the illumination light Lin of the red light LR, in the regions which oppose the green color filter CFG and the blue color filter CFB. The illumination light Lin dispersed toward the main surface PNLa is absorbed into the green color filter CFG and the blue color filter CFB. On the other hand, the illumination light Lin dispersed toward the main surface PNLb is emitted also from the main surface PNLb. Similarly, in the G field, the illumination light Lin can be dispersed on the regions which oppose the red color filter CFR and the blue color filter CFB. In the B field, the illumination light Lin can be dispersed on the regions which oppose the red color filter CFR and the green color filter CFG. With such a display method, the display device DSP can display images only on the main surface PNLb side without displaying on the main surface PNLa side.

FIG. 21 is a table listing colors of the emitted light from the light source and also colors expressible by the display device DSP from the emitted light.

The item "expression" listed in the table indicates colors after the illumination light Lin emitted from each light source is transmitted through the red color filter CFR, the green color filter CFG and the blue color filter CFB. The indication "OFF" means the case where the illumination light Lin is not transmitted.

When using the third display mode, the light source unit LU is not limited to a type comprising a combination of an R light source, a G light source and a B light source, but may be a type comprising a combination of two light sources as long as it can express red, green and blue as transmitting a red color filter CFR, a green color filter CFG and a blue color filter CFB.

The red light source, the blue light source and the green light source can respectively express only red, green and blue. The yellow light source which emits yellow light can express red and green. The magenta light source which emits magenta light can express red and blue. The cyan light source which emits cyan light can express green and blue. Therefore, the light source unit LU may as well be a type of a combination of a yellow light source and a blue light source, a combination of a magenta light source and a green light source or a combination of a cyan light source and a red light source. Moreover, the light source unit LU may as well be of a combination of a yellow light source and a magenta light source, a combination of a magenta light source and a cyan light source, or a combination of a cyan light source and a yellow light source.

Note that the yellow light source comprises, for example, a green LED which emits green light and a red phosphor which absorbs green light and emits red light. The magenta light source comprises, for example, a blue LED which emits blue light and a red phosphor which absorbs blue light and emits red light. The cyan light source comprises, for example, a blue LED which emits blue light and a green phosphor which absorbs blue light and emits green light. The yellow light source may be of a type which turns on the green LED and the red LED simultaneously, the magenta light source may be of a type which turns on the blue LED and the red LED simultaneously, and the cyan light source may be of a type which turns on the blue LED and the green LED simultaneously.

Figure 22:
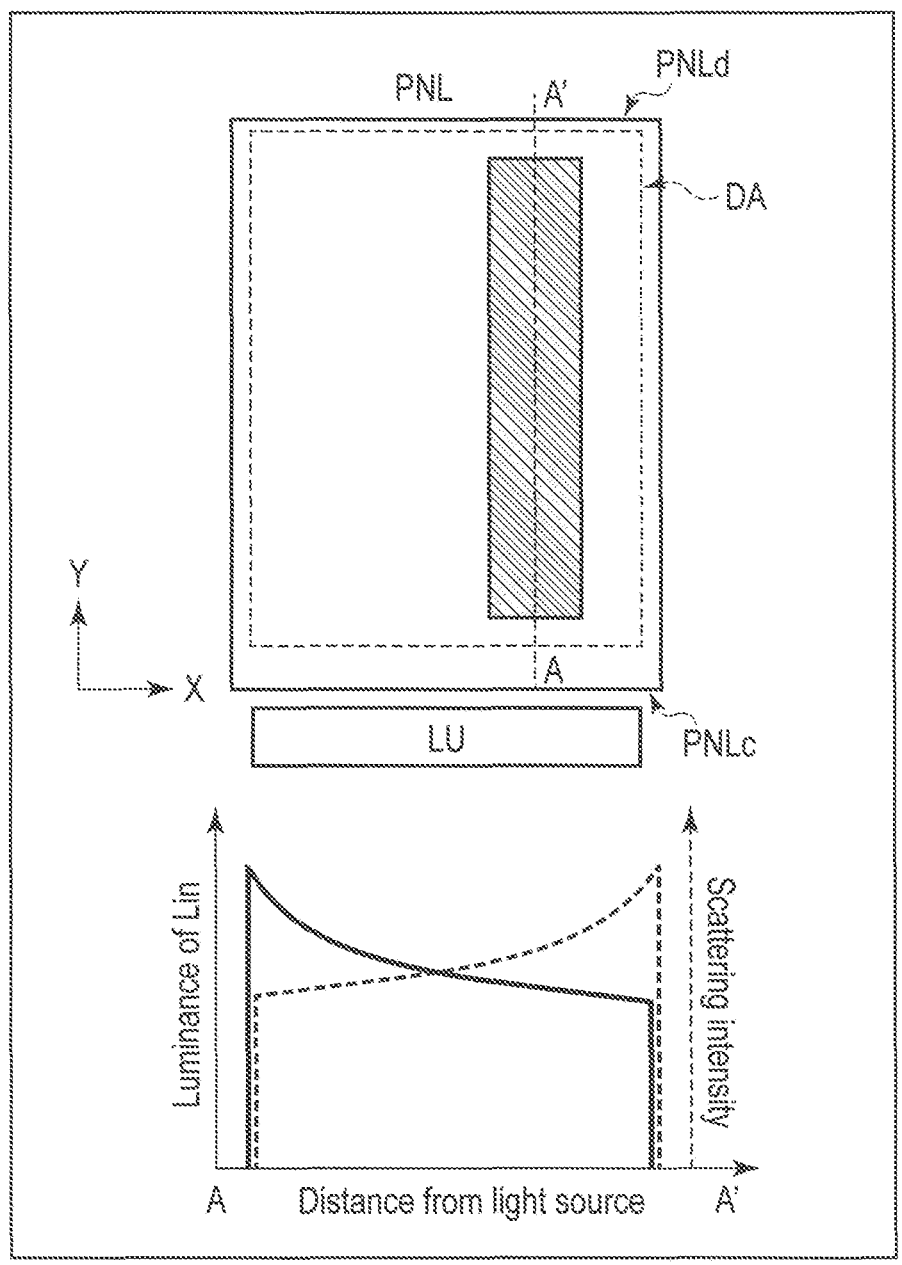
FIG. 22 is a diagram illustrating correction of dispersing intensity.

FIG. 22 is a diagram illustrating correction of the dispersing intensity.

The luminance of the illumination light Lin is high in a position close to the side surface PNLc on a side of the display area DA, close to light source unit LU, whereas the luminance of the illumination light Lin is low a position close to the side surface PNLd on a side away from the light source unit LU. This is because the illumination light Lin is dispersed within the display area DA as described above.

Let us assume that an image is displayed in the region of the diagonally shaded pattern of the display panel PNL. The solid line of the graph in the figure indicates lowering of the luminance of the illumination light Lin along line A-A'. The dotted line of the graph in the figure indicates correction of the dispersing intensity of the light-modulating layer OM along the line A-A', required to equalize the luminance of the region of the diagonally shaded pattern. Such correction of dispersing intensity can be achieved by lowering the gradation value of the voltage applied to the electrode which forms an electric field in the light-modulating layer OM in a position (A) close to the side surface PNLc, and raising the gradation value of the voltage applied to the electrode which forms an electric field in a position (A') close to the side surface PNLd. Thus, the display device DSP can suppress the occurrence of non-uniformity in display.

Figure 23:
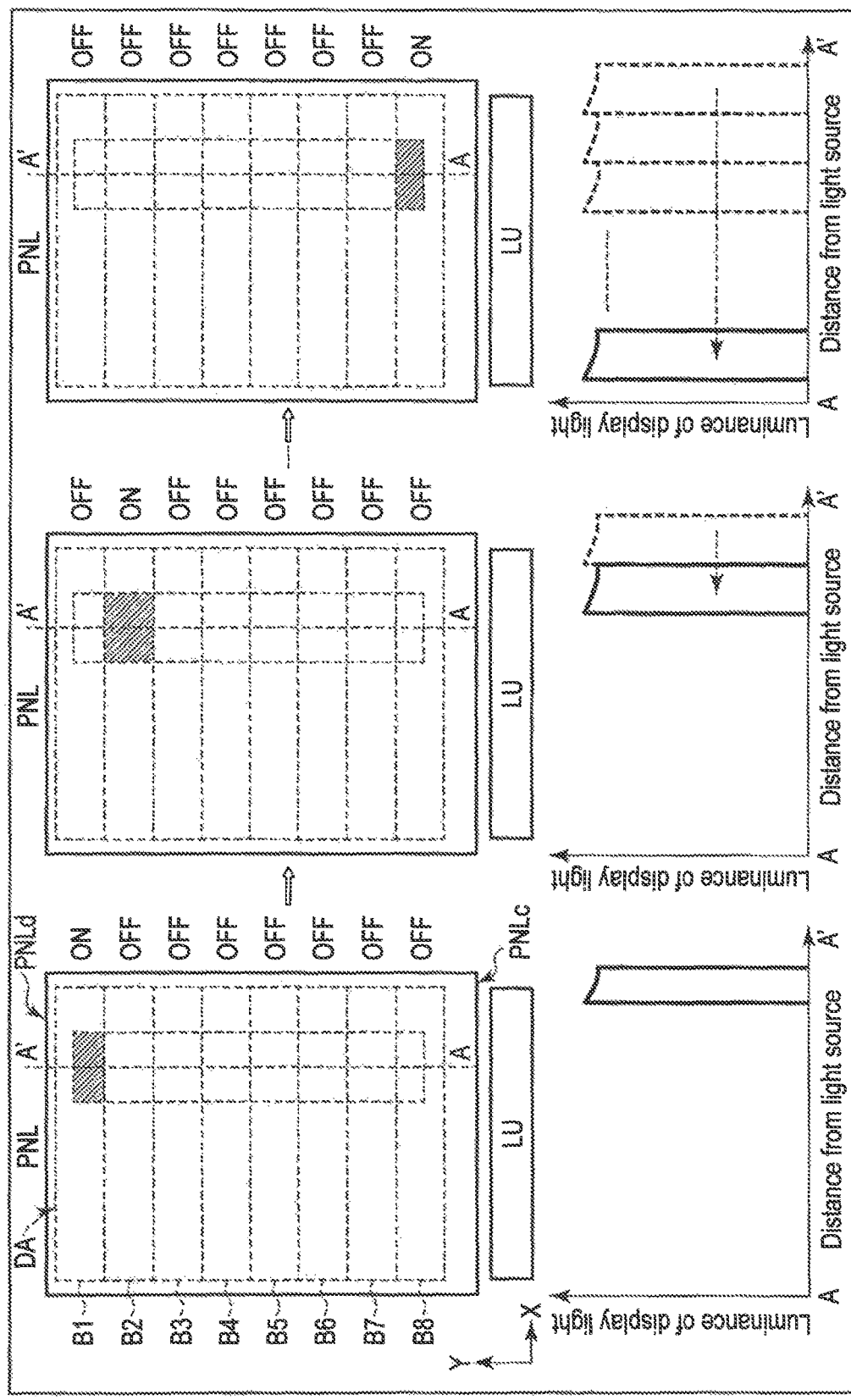
FIG. 23 is a diagram illustrating scan driving.

FIG. 23 is a diagram illustrating scanning drive.

Equalization of the brightness of the display area DA can be achieved also by scan drive. The scan drive divides the display area DA into a plurality of blocks arranged along the second direction Y, and drives the blocks one by one.

In the example illustrated, the display area DA is divided into eight blocks B1 to B8. The blocks B1 to B8 are arranged in this order along the second direction Y from the position close to the side surface PNLd. The number of blocks is not particularly limited, may be seven or less or nine or more.

For example, only those pixels PX arranged in the block B1 are driven, first, and a part of the image is displayed on the block B1. At this point, those pixels PX arranged in the block B2 to B8 are not driven, and therefore the illumination light Lin is guided to the block B1 while suppressing the lowering of the luminance of the illumination light Lin. Next, only those pixels PX arranged in the block B2 are driven, and a part of the image is displayed on the block B2. Then, those pixels PX arranged in the blocks B3 to B8 are driven one by one, and respective parts of the images are displayed in the blocks B3 to B8 one by one. The parts of the images displayed on the blocks B1 to B8 are combined together as one image to be viewed by the viewer.

With the scan drive, lowering of the luminance of the illumination light Lin caused by dispersing can occur only in the regions corresponding to the blocks B1 to B8, and thus the occurrence of non-uniformity in display can be suppressed. Further, with the correction of the dispersing intensity, it is not necessary to control the luminance of the pixels PX, and therefore the brightness of the display image can be improved.

FIG. 24 is a diagram showing the first modification of the display device DSP according to this embodiment.

This modification is different from the configuration example illustrated in FIG. 3 in the point that the electrodes EE12 and EH12 are provided in a region between the pixels PX11 and PX13.

A quasi-pixel QX12 (QX) is formed between the pixels PX11 and PX13. In the region corresponding to the quasi-pixel QX12, the electrodes EE12 and EH12 and the transparent member TP12 are arranged. The transparent member TP12 is formed of, for example, a colorless resin which transmits white light. The transparent member TP12 may be slightly colored to adjust the color tone of the display panel PNL, for example, when not displaying images. The electrodes EE12 and EH12 are located between the electrodes ED11 and EA13 and are adjacent to each other along the second direction Y. The electrode EE12 is adjacent to the electrode ED11 along the second direction, and the electrode EH12 is adjacent to the electrode EA13 along the second direction.

The transparent member TP12 is located between the color filters FD11 and FA13, and opposes the electrodes EE12 and EH12 along the third direction Z. The transparent member TP12 is placed over the entire region corresponding to the quasi-pixel QX12. The transparent member TP12 is in contact with the color filters FD11 and FA13 along the second direction Y. The transparent member TP12 is larger in area than the color filter FA13. A width W6 of the transparent member TP12 along the second direction Y is greater than a width W5 of the color filter FA13 along the second direction Y. For example, the width W6 is about twice the width W5. The transparent member TP12 is formed from the overcoat layer OC, for example.

The quasi-pixel QX12 changes the light dispersibility of the region of the light-modulating layer OM, which opposes the electrode EE12 according to the electric field produced between the electrode EE12 and the common electrode CE. Further, the quasi-pixel QX12 changes the light dispersibility of the region of the light-modulating layer OM, which opposes the electric field EH12 according to the electric field produced between the electrode EH12 and the common electrode. The light dispersed on the regions which oppose the electrodes EE12 and EH12, respectively, is emitted from the main surfaces PNLa and PNLb of the display panel PNL, to contribute to the display of images. Therefore, according to this modification, the brightness of display images can be enhanced, thereby improving the display quality.

Figure 25:
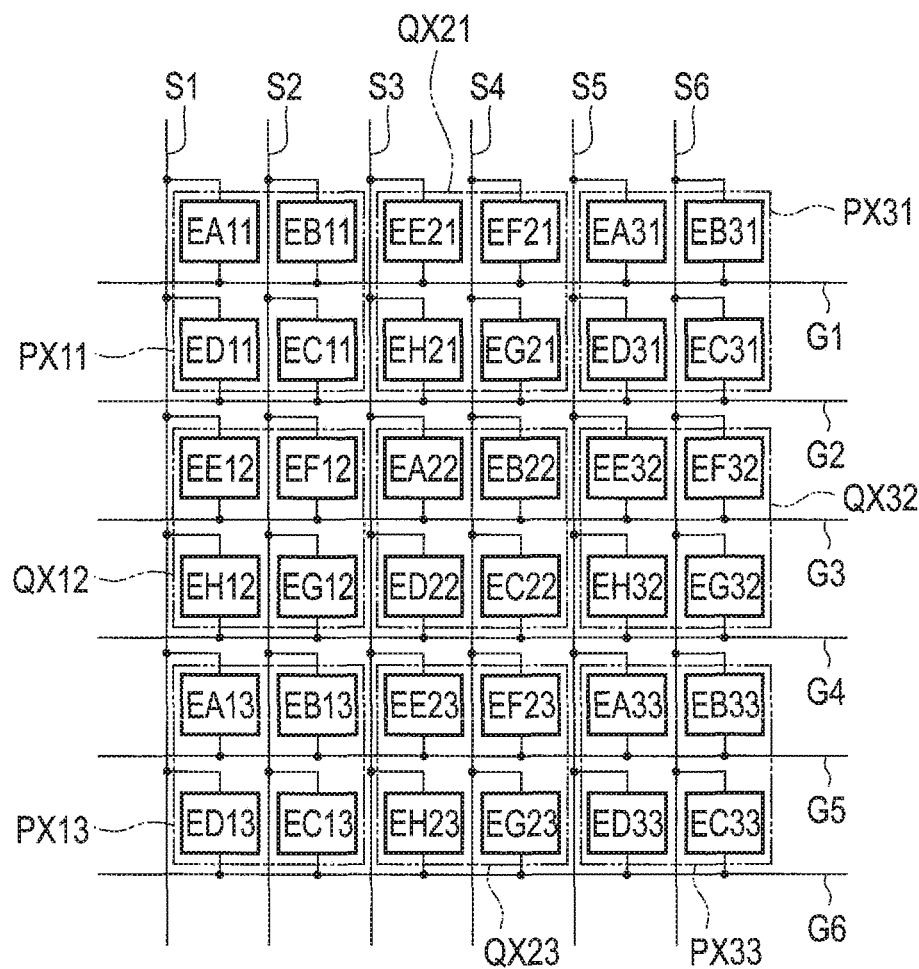
FIG. 25 is a diagram showing a configuration example of a first substrate SUB1 shown in FIG. 24.

FIG. 25 is a diagram showing a configuration example of the first substrate SUB1 shown in FIG. 24.

The configuration example illustrated is different from that shown in FIG. 9 in the point that quasi-pixels QX are arranged. The quasi-pixels QX are arranged between the pixels PXs, and the pixels PX and the quasi-pixels QX are arranged alternately along the first direction X and the second direction Y. The quasi-pixels QX each comprise pixel electrodes EE, EF, EG and EH.

Electrodes EF12 and EG12 of a quasi-pixel QX12 are located between the electrodes EC11 and EB13. The electrode EF12 is adjacent to the electrode EE12 along the first direction X, and is adjacent to the electrode EC11 along the second direction Y. The electrode EG12 is adjacent to the electrode EH12 along the first direction X, and is adjacent to the electrodes EF12 and EB13 along the second direction Y.

The quasi-pixel QX21 located between the pixels PX11 and PX31 along the first direction X comprises electrodes EE21, EF21, EG21 and EH21. The electrode EE21 is located between the electrodes EB11 and EF21 along the first direction X, and the electrode EF21 is located between the electrodes EE21 and EA31 along the first direction X. The electrode EH21 is located between the electrodes EC11 and EG21 along the first direction X, and the electrode EG21 is located between the electrodes EH21 and ED31 along the first direction X.

To the electrodes EE12 and EH12, a data signal is supplied by the data line S1. To the electrodes EF12 and EG12, a data signal is supplied by the data line S2. To the electrodes EE21 and EH21, a data signal is supplied by the data line S3. To the electrodes EF21 and EG21, a data signal is supplied by the data line S4. The driving of the electrodes EE21 and EF21 is controlled by the scanning line G1. The driving of the electrodes EG21 and EH21 is controlled by the scanning line G2. The driving of the electrodes EE12 and EF12 is controlled by the scanning line G3. The driving of the electrodes EG12 and EH32 is controlled by the scanning line G4.

A quasi-pixel QX32 located between the pixels PX31 and PX33 along the second direction Y comprises electrodes EE32, EF32, EG32 and EH32 as in the case of the quasi-pixel QX12. A quasi-pixel QX23 located between the pixels PX13 and PX33 along the first direction X comprises electrodes EE23, EF23, EG23 and EH23 as in the case of the quasi-pixel QX21.

As long as the quasi-pixels QX are arranged between the pixels PX, the layout is not particularly limited, but they may be arranged between the pixels PXs, for example, in the configuration example shown in FIG. 13.

FIG. 26 is a diagram showing the second modification of the display device DSP according to this embodiment.

This modification is different from that shown in FIG. 24 in the point that an electrode EI12 is arranged in a region corresponding to a quasi-pixel QX. The electrode EI12 opposes over the entire surface of the transparent member TP along the third direction X, and is disposed between the electrodes ED11 and EA13. The electrode EI12 is adjacent to the electrodes ED11 and EA13 along the second direction Y.

In this modification also, an advantageous effect similar to that of the first modification can be obtained.

Figure 27:
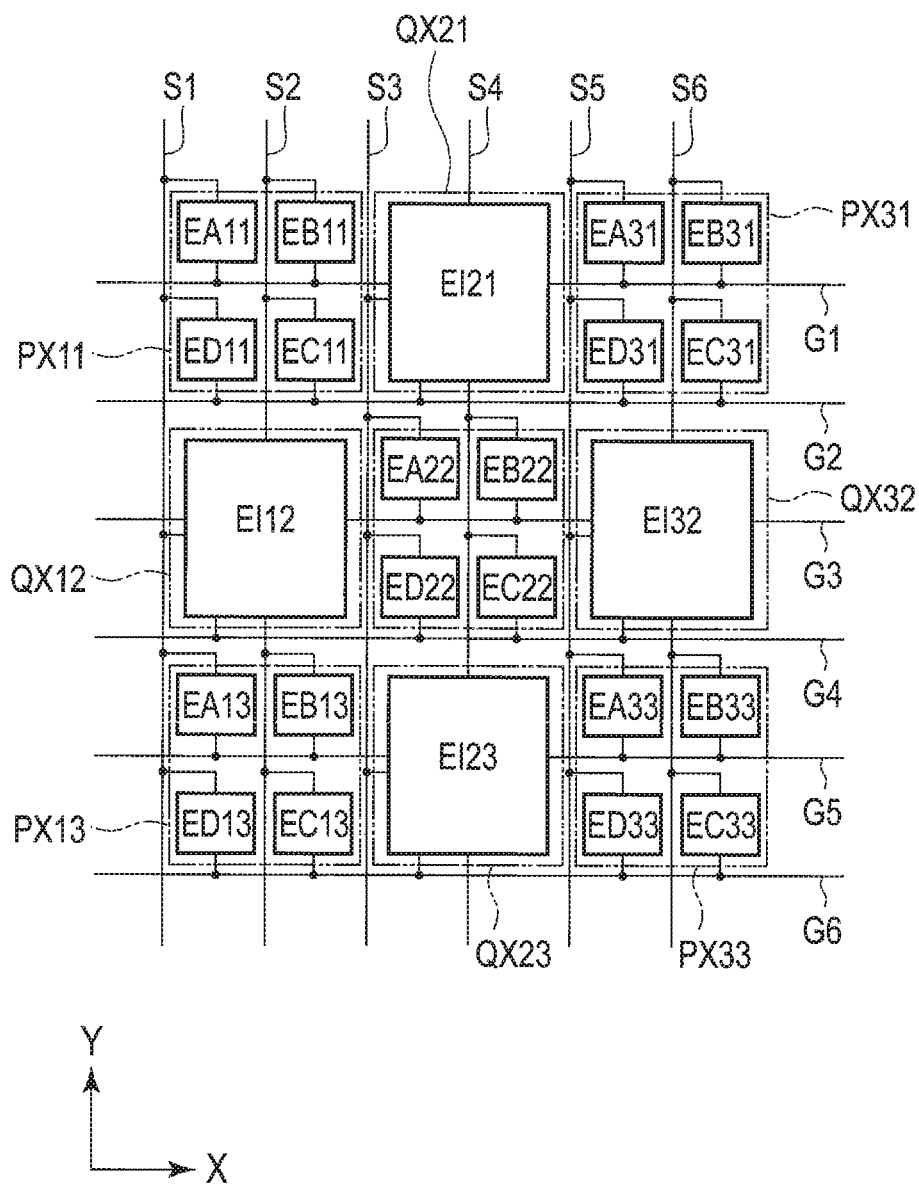
FIG. 27 is a diagram showing a configuration example of a first substrate SUB1 shown in FIG. 26.

FIG. 27 is a diagram showing a configuration example of the first substrate SUB1 shown in FIG. 26.

This configuration example is different from that shown in FIG. 25 in the point that electrodes EI12, EI21, EI32 and EI23 are provided.

The electrode EI12 of the quasi-pixel QX12 located between the pixels PX11 and PX13 along the second direction Y is disposed over the entire region corresponding to the quasi-pixel QX12, and extends to between the electrodes EC11 and EB13. The electrode EI21 of the quasi-pixel QX21 located between the pixels PX11 and PX23 along the first direction X is disposed over the entire region corresponding to the quasi-pixel QX21, and extends to between the electrodes EB11 and EA31 and between the electrodes EC11 and ED31.

To electrode EI12, a data signal is supplied by the data line S1, and the driving thereof is controlled by the scanning line G4. To the electrode EI21, a data signal is supplied by the data line S3, and the driving thereof is controlled by the scanning line G2.

The electrode EI32 of the quasi-pixel QX32 located between the pixels PX23 and PX33 along the second direction Y comprises an electrode EI32 as in the case of the quasi-pixel QX12. The electrode EI23 of the quasi-pixel QX23 located between the pixels PX13 and PX33 along the first direction X comprises an electrode EI23 as in the case of the quasi-pixel QX21.

Figure 28:
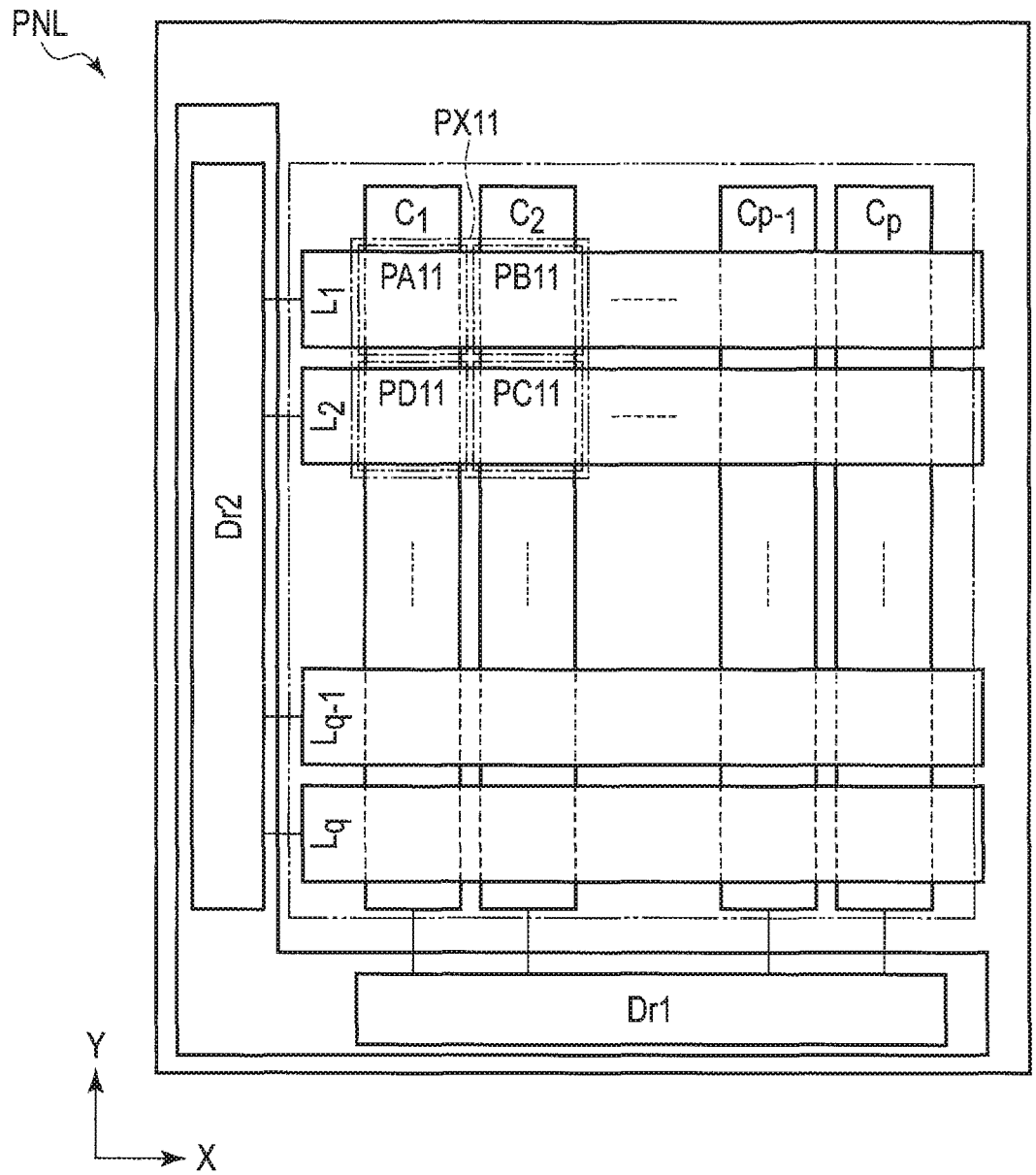
FIG. 28 is a diagram showing a third modification of the display device DSP according to this embodiment.

FIG. 28 is a diagram showing the third modification of the display device DSP according to this embodiment.

The modification illustrated is the so-called passive-matrix display device comprising a plurality of column electrodes C (C1, C2, . . . , Cp) and a plurality of row electrodes L (L1, L2, . . . , Lq). The column electrodes C extend along the second direction Y and are arranged along the first direction X. The row electrodes L extend along the first direction X and are arranged along the second direction Y. The column electrodes C are electrically connected to the first driver Dr1, and the row electrodes L are electrically connected to the second driver Dr2. Regions where the column electrodes C and the row electrodes L cross and oppose each other to each operate as a sub-pixel. For example, the region where the column electrode C1 and the row electrode L1 oppose each other corresponds to a sub-pixel PA11. The region where the column electrode C2 and the row electrode L1 oppose each other corresponds to a sub-pixel PB11. The region where the column electrode C2 and the row electrode L2 oppose each other corresponds to a sub-pixel PC11. The region where the column electrode C1 and the row electrode L2 oppose each other corresponds to a sub-pixel PD11.

In such modifications also, an advantageous effect similar to those described above can be obtained acquired.

As described above, according to this embodiment, a display device with high transparency and excellent visibility even under external light environment can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprises:
a first substrate having light transmissivity;
a second substrate opposing the first substrate and having light transmissivity;
a light-modulating layer arranged between the first substrate and the second substrate;
a light source unit which illuminates the light-modulating layer from an outer side of a position which opposes a display area which displays images, along a normal direction;
first to third color filters of different colors of red, green and blue, respectively, arranged on the first substrate; and
first to third electrodes which oppose the first to third color filters, respectively,
the light-modulating layer being able to change light dispersibility of each of regions which oppose the first to third color filters according to the electric field produced by each respective one of the first to third electrodes.

2. The display device of claim 1, wherein
the display panel including the first substrate, the second substrate and the light-modulating layer, comprises:
a main surface including the display area; and
a side surface crossing the main surface and opposing the light source unit.

3. The display device of claim 1, wherein
the light-modulating layer comprises a first region and a second region both having optical anisotropy and having optical responses to an electric field, different from each other,
the first region contains mainly a liquid crystal material, and
the second region contains mainly a polymeric material.

4. A display device of claim 1, further comprising:
a fourth color filter of a same color as that of one of the first to third color filters,
wherein
the second color filter and the third color filter are adjacent to each other at a first pitch along a first direction, and
the third color filter and the fourth color filter are adjacent to each other at a second pitch greater than the first pitch along the first direction.

5. The display device of claim 4, wherein
the second pitch is three times or more the first pitch.

6. The display device of claim 1, wherein
the light source unit illuminates white light.

7. The display device of claim 1, wherein
the light source unit comprises at least two light sources which emit light of respectively different colors each other.

8. The display device of claim 7, wherein
the light source unit comprises a red light source, a green light source and a blue light source.

9. The display device of claim 7, wherein
the light source unit comprises a yellow light source and a blue light source, or a magenta light source and a green light source, or a cyan light source and a red light source.

10. The display device of claim 1, further comprising a controller which switches among:
a first display mode which displays images utilizing only external light;
a second display mode which displays images utilizing the external light and illumination light from the light source unit; and
a third display mode which displays images utilizing only the illumination light.

11. The display device of claim 10, further comprising:
an external light sensor which detects a brightness and a color of the external light,
wherein
the controller switches the display mode according to environmental data input from the external light sensor.

12. The display device of claim 11, wherein
the controller adjusts a color temperature of a display image according to the environmental data.

13. The display device of claim 11, wherein
the external light sensor comprises
a red sensor which measures the brightness of the external light which transmitted the red color filter;
a green sensor which measures the brightness of the external light which transmitted the green color filter; and
a blue sensor which measures the brightness of the external light which transmitted the blue color filter.

14. The display device of claim 11, wherein
the external light sensor comprises a spectrum meter.

15. The display device of claim 10, further comprising:
a selector which is able to switches selection data,
wherein the controller switches the display mode according to the selection data input from the selector.

16. A display device comprises:
a first substrate having light transmissivity;
a second substrate opposing the first substrate and having light transmissivity;
a light-modulating layer arranged between the first substrate and the second substrate;
a light source unit which illuminates the light-modulating layer from an outer side of a position which opposes a display area which displays images, along a normal direction;
first to third color filters of different colors of red, green and blue, respectively, arranged on the first substrate;
a fourth color filter of a same color as that of one of the first to third color filters, arranged on the first substrate;
a transparent member located between the third color filter and the fourth color filter and being larger in area than the third color filter;
first to fourth electrodes which oppose the first to fourth color filters, respectively; and
a fifth electrode that opposes the transparent member,
the light-modulating layer being able to change light dispersibility of each of regions which oppose the first to fifth color filters according to the electric field produced by each respective one of the first to fifth electrodes.

* * * * *